United States Patent
Gou et al.

(10) Patent No.: US 10,575,184 B2
(45) Date of Patent: Feb. 25, 2020

(54) METHOD AND DEVICE FOR USING UNLICENSED CARRIER IN TRANSMITTING AND RECEIVING SIGNAL

(71) Applicant: ZTE CORPORATION, Shenzhen, Guangdong Province (CN)

(72) Inventors: Wei Gou, Shenzhen (CN); Bo Dai, Shenzhen (CN); Yajun Zhao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 18 days.

(21) Appl. No.: 15/505,925

(22) PCT Filed: Aug. 21, 2015

(86) PCT No.: PCT/CN2015/087854
§ 371 (c)(1),
(2) Date: Jun. 19, 2017

(87) PCT Pub. No.: WO2016/029826
PCT Pub. Date: Mar. 3, 2016

(65) Prior Publication Data
US 2017/0353866 A1    Dec. 7, 2017

(30) Foreign Application Priority Data
Aug. 25, 2014 (CN) .......................... 2014 1 0423088

(51) Int. Cl.
*H04W 16/14* (2009.01)
*H04L 5/00* (2006.01)
(Continued)

(52) U.S. Cl.
CPC .............. *H04W 16/14* (2013.01); *H04L 5/001* (2013.01); *H04L 5/0005* (2013.01);
(Continued)

(58) Field of Classification Search
CPC ... H04W 16/14; H04W 56/00; H04W 56/001; H04W 56/0015; H04W 72/04;
(Continued)

(56) References Cited

U.S. PATENT DOCUMENTS

| 5,850,596 A * | 12/1998 | Reynolds ................. H04B 1/10 |
| | | 455/63.1 |
| 9,949,315 B2 * | 4/2018 | Damnjanovic ....... H04W 16/14 |

(Continued)

FOREIGN PATENT DOCUMENTS

| CN | 101006689 A | 7/2007 |
| CN | 101047432 A | 10/2007 |

(Continued)

OTHER PUBLICATIONS

Office Action dated Apr. 16, 2019 for Chinese Patent Application No. 201510439952.8 and English Translation.

(Continued)

*Primary Examiner* — Kashif Siddiqui
(74) *Attorney, Agent, or Firm* — Cantor Colburn LLP

(57) ABSTRACT

The embodiments of the present disclosure provide a method and apparatus for transmitting and receiving a signal using an unlicensed carrier, applied in a base station. After a right to use the unlicensed carrier is preempted by the base station, the signal in remaining resources and/or a subframe subsequent is transmitted to the remaining resources, herein the signal includes one or more of start symbol identity information, a synchronization signal, a reference signal, and a service data signal, herein, the remaining resources includes the complete Orthogonal Frequency-Division Multiplexing (OFDM) symbols located in a contention back-off window and after a time point when the right to use the unlicensed carrier is contended, or complete OFDM symbols from the time point when the right to use the unlicensed carrier is contended by the base station up to an end time of a subframe in which the time point is located.

7 Claims, 2 Drawing Sheets

(51) Int. Cl.
  *H04L 27/00* (2006.01)
  *H04L 27/26* (2006.01)
  *H04W 24/10* (2009.01)
  *H04W 72/04* (2009.01)
  *H04W 74/08* (2009.01)

(52) U.S. Cl.
  CPC .......... *H04L 5/0007* (2013.01); *H04L 5/0048* (2013.01); *H04L 5/0091* (2013.01); *H04L 27/0006* (2013.01); *H04L 27/2608* (2013.01); *H04W 24/10* (2013.01); *H04W 72/0453* (2013.01); *H04W 72/0486* (2013.01); *H04W 74/0816* (2013.01); *H04L 5/0053* (2013.01)

(58) Field of Classification Search
  CPC . H04W 72/0406; H04W 88/02; H04W 24/10; H04W 72/0453; H04W 72/0486; H04W 74/0808; H04W 74/0816; H04L 5/00; H04L 5/0007; H04L 5/0048; H04L 7/04; H04L 27/00; H04L 27/0006; H04L 27/26; H04L 27/2608; H04L 5/0005; H04L 5/001; H04L 5/0053; H04L 5/0091
  See application file for complete search history.

(56) References Cited

U.S. PATENT DOCUMENTS

| | | | | |
|---|---|---|---|---|
| 2009/0054029 A1* | 2/2009 | Hogberg | ............ | H04L 41/5006 455/404.2 |
| 2013/0128823 A1 | 5/2013 | Turtinen et al. | | |
| 2014/0036889 A1 | 2/2014 | Kim et al. | | |
| 2014/0112289 A1 | 4/2014 | Kim et al. | | |
| 2015/0092768 A1* | 4/2015 | Ng | ........................ | H04W 48/16 370/350 |
| 2015/0223075 A1* | 8/2015 | Bashar | .................. | H04W 16/14 370/329 |
| 2015/0245411 A1* | 8/2015 | Damnjanovic | ....... | H04W 16/14 370/328 |
| 2015/0271847 A1* | 9/2015 | Luo | ..................... | H04W 74/002 370/329 |
| 2015/0280871 A1* | 10/2015 | Xu | ..................... | H04W 72/0446 370/330 |
| 2015/0334744 A1* | 11/2015 | Ji | ....................... | H04W 74/0816 370/336 |
| 2015/0358827 A1* | 12/2015 | Bendlin | ............ | H04W 72/0413 455/454 |
| 2016/0007307 A1* | 1/2016 | Wei | ..................... | H04W 56/001 370/328 |
| 2016/0036617 A1* | 2/2016 | Luo | ..................... | H04L 27/2662 375/260 |
| 2016/0056935 A1* | 2/2016 | Damnjanovic | ........ | H04L 5/0048 370/252 |
| 2016/0057731 A1* | 2/2016 | Damnjanovic | ..... | H04W 68/005 455/458 |
| 2016/0337101 A1* | 11/2016 | Gao | ..................... | H04L 5/0082 |
| 2016/0337869 A1* | 11/2016 | Dai | .................. | H04W 74/085 |
| 2016/0337997 A1* | 11/2016 | Huang | ..................... | H04L 7/04 |
| 2017/0111217 A1* | 4/2017 | Kim | ........................ | H04L 41/08 |
| 2017/0142737 A1* | 5/2017 | Zheng | ................. | H04W 72/085 |

FOREIGN PATENT DOCUMENTS

| | | |
|---|---|---|
| CN | 102104961 A | 6/2011 |
| CN | 103338454 A | 10/2013 |
| CN | 103517343 A | 1/2014 |
| CN | 103532688 A | 1/2014 |
| CN | 103580840 A | 2/2014 |
| CN | 103650622 A | 3/2014 |
| CN | 104301273 A | 1/2015 |
| WO | WO2012139278 A1 | 10/2012 |
| WO | WO2013131267 A1 | 9/2013 |

OTHER PUBLICATIONS

Office Action dated May 20, 2019 for Chinese Patent Application No. 201510439356.X and English Translation.

\* cited by examiner

METHOD AND DEVICE FOR USING UNLICENSED CARRIER IN TRANSMITTING AND RECEIVING SIGNAL

TECHNICAL FIELD

The present disclosure relates to the field of communications, and in particular, to a method and apparatus for transmitting and receiving data using an unlicensed carrier.

BACKGROUND

Up to now, it is well known that Long Term Evolution (LTE) systems are deployed to operate in licensed carriers. However, with the evolution of the LTE, some companies (such as Qualcomm) in the second half of 2013 proposed and suggested to study on the subject of the deployment of the LTE in unlicensed carriers. However, it has not yet been accepted by the LTE and a project thereof has not yet been set up by the LTE.

Qualcomm gives the reasons for the project, which are primarily that with the rapid growth of data services, in the near future, the licensed spectrum can no longer bear such a huge amount of data. It is recommended to consider deploying the LTE in an unlicensed spectrum to share the data traffic in the licensed carrier through the unlicensed spectrum.

The unlicensed spectrum has the following characteristics:

1. It is free of charge/has a low cost, there is no need to buy the unlicensed spectrum for use, and a cost for the spectrum resources is almost zero;

2. The access requirements are low, the cost is low, individuals and companies can participate in the deployment, and devices of any equipment manufacturer can be used.

3. Resources can be shared, and when a number of different communication systems are operating in the unlicensed spectrum, or different operators of the same communication system are operating in the unlicensed spectrum, some manners for sharing resources can be used, which improves the spectral efficiency.

4. There are a lot of wireless access technologies, which can be across different communication standards and are difficult to collaborate, and the network topologies are diverse.

5. There are a lot of wireless access sites and a number of users, which are difficult to collaborate, and results in a large centralized management overhead.

6. There are a lot of applications, in which a variety of services can operate, such as Machine to Machine (M2M) communication, and Vehicle to Vehicle (V2V) communication.

The above-mentioned basic characteristics determine that the unlicensed spectrum may be an important evolution direction of the wireless communication system, but there are also many problems at the same time. For example, there will be a variety of wireless systems in the unlicensed spectrum which are difficult to coordinate with each other and which interfere with each other.

The LTE is deployed in the unlicensed carrier, and there is still a need to support the regulations for the unlicensed carrier. Most countries require communication systems to support the listening first then speaking mechanism when the communication systems are deployed in the unlicensed carrier. Through the listening first then speaking mechanism, it can avoid interference of adjacent systems to each other due to the use of unlicensed carriers by the adjacent systems at the same time. In addition, a contention mechanism is further introduced, that is, adjacent system sites (usually adjacent sites of the same system) can avoid the interference due to the use of the unlicensed carriers by the adjacent sites of the same system at the same time through the contention mechanism.

For a LTE system, during contention in a designed contention window, an LTE base station may contend for unlicensed carrier resources at any time, that is, a time when the LTE base station contends for a right to use the unlicensed carrier is mostly not aligned with the beginning of a subframe of the LTE system. The base station often acquires the right to use the unlicensed carrier at a time within a subframe. However, according to the scheduling mechanism of the LTE system, a scheduling time is in units of subframes, and then how to use resources in a period of time from the time when the base station contends for the unlicensed carrier up to a start time of a next subframe is a problem to be solved.

SUMMARY

The following is an overview of the subjects which are described in detail herein. This overview is not intended to limit the protection scope of the claims.

The embodiments of the present disclosure provide a method and apparatus for transmitting and receiving a signal using an unlicensed carrier, which enables re-utilization of resources of generated incomplete subframes during the contention for the right to use the unlicensed carrier, so as to avoid a waste of resources.

A method for transmitting a signal using an unlicensed carrier, applied in a base station, includes the following steps.

After a right to use the unlicensed carrier is preempted, the signal in remaining resources and/or a subframe subsequent is transmitted to the remaining resources, herein the signal includes one or more of start symbol identity information, a synchronization signal, a reference signal, and a service data signal.

Herein, the remaining resources includes complete Orthogonal Frequency-Division Multiplexing (OFDM) symbols located in a contention back-off window and after a time point when the right to use the unlicensed carrier is contended, or complete OFDM symbols from the time point when the right to use the unlicensed carrier is contended by the base station up to an end time of a subframe at the time point.

In an exemplary embodiment, when the signal includes the service data signal, control information corresponding to the service data is transmitted in a licensed carrier or the unlicensed carrier, herein a time-domain position of the control information is a subframe next to the subframe corresponding to the time point when the unlicensed carrier is contended by the base station.

In an exemplary embodiment, transmitting the signal in remaining resources and/or a subframe subsequent to the remaining resources includes the following steps.

After the unlicensed carrier is preempted within the contention window, from the time point when the right to use the unlicensed carrier is acquired, positions of OFDM symbols corresponding to remaining time in the subframe is confirmed, and the signal using the OFDM symbols is transmitted.

In an exemplary embodiment, transmitting the signal in remaining resources and/or a subframe subsequent to the remaining resources includes the following step.

The time point when the unlicensed carrier is contended is used as a start point of the subframe, dividing into subframes from the start point, and the signal from a first OFDM symbol in a first divided subframe is transmitted.

In an exemplary embodiment, arranging OFDM symbols in accordance with a time length of an OFDM symbol from the end point of the subframe to the time point when the unlicensed carrier is contended by the base station, until a complete OFDM symbol cannot be arranged, and transmitting the signal using complete OFDM symbols after the time point when the unlicensed carrier is contended by the base station.

In an exemplary embodiment, the method further includes the following steps.

Agreeing with a receiving end in advance on time-domain positions where the synchronization signal is transmitted, herein the synchronization signal is only transmitted in first 2 OFDM symbols after the unlicensed carrier is contended. Or the synchronization signal is transmitted from the subframe next to the subframe when the unlicensed carrier is contended by the base station. Or the synchronization signal is transmitted periodically or for a predefined number of times from the subframe next to the subframe when the unlicensed carrier is contended. Or the synchronization signal and/or the reference signal are transmitted in the unlicensed carrier after the unlicensed carrier is contended to imply information of a time length in which the unlicensed carrier is occupied by the base station at this time.

In an exemplary embodiment, the method further includes the following step.

When the synchronization signal is a Primary Synchronization Signal (PSS)/Secondary Synchronization Signal (SSS), agreeing with the receiving end that a PSS/SSS sequence in the unlicensed carrier is the same as a PSS/SSS sequence of the licensed carrier corresponding to the unlicensed carrier, or indicating the PSS/SSS sequence of the synchronization signal in configuration information of the synchronization signal transmitted in the licensed carrier.

In an exemplary embodiment, the reference signal includes one or more of a Cell-specific Reference Signal (CRS), a Positioning Reference Signal (PRS), a Channel State Information Reference Signal (CSI-RS), and a Sounding Reference Signal (SRS). And the reference signal only starts to be transmitted in remaining resources after the unlicensed carrier is contended by the base station, and includes at least a complete subframe. Or the reference signal is transmitted periodically from the subframe when the unlicensed carrier is contended by the base station. Or the reference signal is transmitted for a predefined number of times from the subframe when the unlicensed carrier is contended by the base station.

In an exemplary embodiment, the start symbol identities are used to identify start positions of complete OFDM symbols in the remaining resources. The start symbol identities are a sequence which is agreed by the base station with the receiving end in advance or which is configured by the base station, and the base station agrees with the receiving end that the sequence is transmitted in OFDM positions in the remaining resources. And when the base station configures the sequence corresponding to the start symbol identities, the base station transmits configuration information of the start symbol identities to the receiving end through a RRC message or DCI signaling in the licensed carrier.

In an exemplary embodiment, when the start symbol identities are LTE PSS/SSSes, the base station transmits the start symbol identities in carrier frequency-domain positions different from those of the LTE PSS/SSSes specified in the 3GPP TS 36.211 V10.2.0. Or an OFDM symbol interval different from that of the LTE PSS/SSSes specified in the 3GPP TS 36.211 V10.2.0 is maintained between the PSS/SSSes of the start symbol identities. Or a time order of the PSS/SSSes of the start symbol identities is different from that of the LTE PSS/SSSes specified in the 3GPP TS 36.211 V10.2.0.

In an exemplary embodiment, the method further includes the following step.

he receiving end is notified whether there is a synchronization signal in the unlicensed carrier, herein a period in which the synchronization signal is transmitted and a start subframe position where the synchronization signal is transmitted are agreed with the receiving end in advance or is configured by the base station.

In an exemplary embodiment, the configuration information of the synchronization signal is transmitted to the receiving end through a RRC message or DCI signaling in the licensed carrier, herein the configuration information of the synchronization signal includes the period in which the synchronization signal is transmitted and the start subframe position where the synchronization signal is transmitted. Or an agreement is made with the receiving end that the synchronization signal is transmitted from a first complete subframe occupied by the base station.

In an exemplary embodiment, the method further includes the following step.

Agreeing with the receiving end in advance on or configuring the reference signal to be transmitted, and configuration information of the reference signal is transmitted to the receiving end through a RRC message or DCI signaling of the licensed carrier, herein the reference signal comprises a CSI-RS, a CRS, a DMRS, a discovery signal or a RS to be monitored.

In an exemplary embodiment, when the reference signal includes the CSI-RS, preemption of the right to use the unlicensed carrier is agreed with the receiving end or is configured as an event to trigger transmission of the CSI-RS.

In an exemplary embodiment, the transmitting end transmits the reference signal immediately after acquiring the right to use the unlicensed carrier, herein when the reference signal includes the CSI-RS, the CSI-RS transmitted by the transmitting end is transmitted in accordance with CSI-RS configuration agreed in advance with the receiving end or in accordance with the CSI-RS configuration notified to the receiving end in advance through the licensed carrier; or the transmitting end transmits the CSI-RS in LTE OFDM symbols in the subframe when the unlicensed carrier is contended, or the transmitting end starts to transmit the CSI-RS from a subframe next to the subframe when the unlicensed carrier is contended.

A method for receiving a signal using an unlicensed carrier, applied in a receiving end, includes the following steps.

The signal in remaining resources in the unlicensed carrier and/or a subframe subsequent to the remaining resources is received, herein the signal includes one or more of start symbol identity information, a synchronization signal, a reference signal, and a service data signal.

herein, the remaining resources includes complete Orthogonal Frequency-Division Multiplexing (OFDM) symbols located in a contention back-off window of a transmitting end and after a time point when the right to use the unlicensed carrier is contended, or complete OFDM symbols from the time point when the right to use the unlicensed carrier is contended by the transmitting end up to an end time of a subframe in which the time point is located.

In an exemplary embodiment,
when the signal includes the service data signal, control information corresponding to the service data is received in a licensed carrier or the unlicensed carrier, herein a time-domain position of the control information is a subframe next to the subframe corresponding to the time point when the unlicensed carrier is contended by the transmitting end.

In an exemplary embodiment,
time-domain positions where the synchronization signal is received are agreed with the transmitting end in advance, herein the synchronization signal is only received in first 2 OFDM symbols after the unlicensed carrier is contended by the transmitting end. Or the synchronization signal is received from the subframe next to the subframe when the unlicensed carrier is contended by the transmitting end. Or the synchronization signal is received periodically or for a predefined number of times from the subframe next to the subframe when the unlicensed carrier is contended by transmitting end.

In an exemplary embodiment,
when the synchronization signal is a Primary Synchronization Signal (PSS)/Secondary Synchronization Signal (SSS), an agreement is made with the transmitting end that a PSS/SSS sequence in the unlicensed carrier is the same as a PSS/SSS sequence of the licensed carrier corresponding to the unlicensed carrier. Or configuration information of the synchronization signal is received in the licensed carrier, herein the configuration information indicates the PSS/SSS sequence of the synchronization signal.

In an exemplary embodiment,
the reference signal includes one or more of a Cell-specific Reference Signal (CRS), a Positioning Reference Signal (PRS), a Channel State Information Reference Signal (CSI-RS), and a Sounding Reference Signal (SRS). And the reference signal is only received from a first OFDM symbol after the unlicensed carrier is contended by the transmitting end, and the reference signal is received at least in a complete subframe. Or the reference signal is received periodically from the subframe when the unlicensed carrier is contended by the transmitting end; or the reference signal is received for a predefined number of times from the subframe when the unlicensed carrier is contended by the transmitting end.

In an exemplary embodiment,
information of a time length during which the unlicensed carrier is occupied by the transmitting end is acquired by receiving synchronization signals and/or reference signals transmitted in the unlicensed carrier.

In an exemplary embodiment,
the occupied time length during which the unlicensed carrier is occupied by the transmitting end is acquired according to different sequences of synchronization signals and/or reference signals representing different occupied time lengths which is agreed with the transmitting end.

In an exemplary embodiment,
the start symbol identities are used to identify start positions of complete OFDM symbols in the remaining resources. The start symbol identities are a sequence which is agreed by the receiving end with the transmitting end in advance or which is configured by the transmitting end, the receiving end agrees with the transmitting end that the sequence is transmitted in OFDM positions in the remaining resources, and when the transmitting end configures the sequence corresponding to the start symbol identities, configuration information of the start symbol identities is received through a RRC message or DCI signaling in the licensed carrier.

In an exemplary embodiment,
when the start symbol identities are LTE PSS/SSSes, the LTE PSS/SSSes are received in carrier frequency-domain positions different from those of the LTE PSS/SSSes specified in the 3GPP TS 36.211 V10.2.0. Or when the PSS/SSSes of the start symbol identities are received, an OFDM symbol interval different from that of the LTE PSS/SSSes specified in the 3GPP TS 36.211 V10.2.0 is maintained. Or a time order in which the PSS/SSSes of the start symbol identities are received is different from that of the LTE PSS/SSSes specified in the 3GPP TS 36.211 V10.2.0.

In an exemplary embodiment, the method further includes the following steps.

receiving information of whether there is a synchronization signal in the unlicensed carrier which is notified by the transmitting end, herein a period in which the synchronization signal is transmitted and a start subframe position where the synchronization signal is transmitted are agreed with the transmitting end in advance or is configured by the transmitting end.

In an exemplary embodiment,
the configuration information of the synchronization signal is received through a RRC message or DCI signaling in the licensed carrier, herein the configuration information of the synchronization signal includes the period in which the synchronization signal is transmitted and the start subframe position where the synchronization signal is transmitted. Or an agreement is made with the transmitting end that the synchronization signal is received from a first complete subframe occupied by the transmitting end.

In an exemplary embodiment, the method further includes the following step.

agreeing with the transmitting end in advance on or configuring by the transmitting end the reference signal to be transmitted, and receiving configuration information of the reference signal through a RRC message or DCI signaling of the licensed carrier, herein the reference signal includes a CSI-RS, a CRS, a DMRS, a discovery signal or a RS to be monitored.

In an exemplary embodiment, the method further includes:

when the reference signal includes the CSI-RS, agreeing with the transmitting end on or configuring by the transmitting end preemption of the right to use the unlicensed carrier as an event to trigger transmission of the CSI-RS.

In an exemplary embodiment,
when the reference signal includes the CSI-RS,
the receiving end receives the CSI-RS in accordance with CSI-RS configuration agreed in advance with the transmitting end. Or the receiving end receives the CSI-RS in accordance with the CSI-RS configuration which is received in advance through the licensed carrier. Or the receiving end receives the CSI-RS in LTE OFDM symbols in the subframe when the unlicensed carrier is contended by the transmitting end, or the receiving end starts to receive the CSI-RS from a subframe next to the subframe when the unlicensed carrier is contended by the transmitting end.

In an exemplary embodiment, the method further includes the following steps.

a notification from the transmitting end is received to acquire that the transmitting end does not transmit the signal in the remaining resources. Or the transmitting end receives information of a contention back-off time point transmitted by the receiving end, and when it is judged that the back-off time point is located within a time period of a last OFDM symbol, the transmitting end does not transmits the signal in the remaining resources.

An apparatus for transmitting a signal using an unlicensed carrier, applied in a base station, includes the following modules.

A transmission module is arranged to, after a right to use the unlicensed carrier is preempted by the base station, transmit the signal in remaining resources and/or a subframe subsequent to the remaining resources, herein the signal includes one or more of start symbol identity information, a synchronization signal, a reference signal, and a service data signal, herein, the remaining resources includes complete Orthogonal Frequency-Division Multiplexing (OFDM) symbols located in a contention back-off window and after a time point when the right to use the unlicensed carrier is contended, or complete OFDM symbols from the time point when the right to use the unlicensed carrier is contended by the base station up to an end time of a subframe in which the time point is located.

In an exemplary embodiment, the transmission module is arranged to, when the signal includes the service data signal, transmit control information corresponding to the service data in a licensed carrier or the unlicensed carrier, herein a time-domain position of the control information is a subframe next to the subframe corresponding to the time point when the unlicensed carrier is contended by the base station.

In an exemplary embodiment, the transmission module is arranged to use the time point when the unlicensed carrier is contended as a start point of the subframe, divide into subframes from the start point, and transmit the signal from a first OFDM symbol in a first divided subframe.

In an exemplary embodiment, the transmission module is arranged to arrange OFDM symbols in accordance with a time length of an OFDM symbol from the end point of the subframe to the time point when the unlicensed carrier is contended by the base station, until a complete OFDM symbol cannot be arranged, and transmit the signal using complete OFDM symbols after the time point when the unlicensed carrier is contended by the base station.

In an exemplary embodiment, the apparatus further includes the following module.

a configuration module is arranged to agree with a receiving end in advance on time-domain positions where the synchronization signal is transmitted, herein the synchronization signal is only transmitted in first 2 OFDM symbols after the unlicensed carrier is contended. Or the synchronization signal is transmitted from the subframe next to the subframe when the unlicensed carrier is contended by the base station. Or the synchronization signal starts to be transmitted periodically or for a predefined number of times from the subframe next to the subframe when the unlicensed carrier is contended. Or the synchronization signal and/or the reference signal are transmitted in the unlicensed carrier after the unlicensed carrier is contended to imply information of a time length in which the unlicensed carrier is occupied by the base station at this time.

In an exemplary embodiment, the reference signal includes one or more of a Cell-specific Reference Signal (CRS), a Positioning Reference Signal (PRS), a Channel State Information Reference Signal (CSI-RS), and a Sounding Reference Signal (SRS); and the reference signal only starts to be transmitted in remaining resources after the unlicensed carrier is contended by the base station, and includes at least a complete subframe. Or the reference signal is transmitted periodically from the subframe when the unlicensed carrier is contended by the base station. Or the reference signal is transmitted for a predefined number of times from the subframe when the unlicensed carrier is contended by the base station.

In an exemplary embodiment, the start symbol identities are used to identify start positions of complete OFDM symbols in the remaining resources. The start symbol identities are a sequence which is agreed by the base station with the receiving end in advance or which is configured by the base station, the base station agrees with the receiving end that the sequence is transmitted in OFDM positions in the remaining resources, and when the base station configures the sequence corresponding to the start symbol identities, the base station transmits configuration information of the start symbol identities to the receiving end through a RRC message or DCI signaling in the licensed carrier.

In an exemplary embodiment, when the start symbol identities are LTE PSS/SSSes, the base station transmits the start symbol identities in carrier frequency-domain positions different from those of the LTE PSS/SSSes specified in the 3GPP TS 36.211 V10.2.0. Or an OFDM symbol interval different from that of the LTE PSS/SSSes specified in the 3GPP TS 36.211 V10.2.0 is maintained between the PSS/SSSes of the start symbol identities. Or a time order of the PSS/SSSes of the start symbol identities is different from that of the LTE PSS/SSSes specified in the 3GPP TS 36.211 V10.2.0.

In an exemplary embodiment, the apparatus further includes the following module.

a configuration module is arranged to agree with the receiving end in advance on or configure the reference signal to be transmitted, and transmit configuration information of the reference signal to the receiving end through a RRC message or DCI signaling of the licensed carrier, herein the reference signal includes a CSI-RS, a CRS, a DMRS, a discovery signal or a RS to be monitored.

In an exemplary embodiment, the configuration module is further arranged to, when the reference signal includes the CSI-RS, agree with the receiving end on or configure preemption of the right to use the unlicensed carrier as an event to trigger transmission of the CSI-RS.

In an exemplary embodiment-, the transmission module is arranged to transmit the reference signal immediately after acquiring the right to use the unlicensed carrier, herein when the reference signal includes the CSI-RS, herein the CSI-RS is transmitted in accordance with CSI-RS configuration agreed in advance with the receiving end or in accordance with the CSI-RS configuration notified to the receiving end in advance through the licensed carrier. Or the CSI-RS is transmitted in LTE OFDM symbols in the subframe when the unlicensed carrier is contended, or the CSI-RS is transmitted from a subframe next to the subframe when the unlicensed carrier is contended.

An apparatus for receiving a signal using an unlicensed carrier, applied in a receiving end, includes the following module.

A reception module is arranged to receive the signal in remaining resources in the unlicensed carrier and/or a subframe subsequent to the remaining resources, herein the signal includes one or more of start symbol identity information, a synchronization signal, a reference signal, and a service data signal.

Herein, the remaining resources includes complete Orthogonal Frequency-Division Multiplexing (OFDM) symbols located in a contention back-off window of a transmitting end and after a time point when the right to use the unlicensed carrier is contended, or complete OFDM symbols from the time point when the right to use the unlicensed carrier is contended by the transmitting end up to an end time of a subframe in which the time point is located.

In an exemplary embodiment, the reception module is arranged to, when the signal includes the service data signal, receive control information corresponding to the service data in a licensed carrier or the unlicensed carrier, herein a time-domain position of the control information is a subframe next to the subframe corresponding to the time point when the unlicensed carrier is contended by the transmitting end.

In an exemplary embodiment, the apparatus further includes the following units.

A configuration unit is arranged to agree with the transmitting end in advance on time-domain positions where the synchronization signal is received, herein the synchronization signal is only received in first 2 OFDM symbols after the unlicensed carrier is contended by the transmitting end. Or synchronization signal starts to be received from the subframe next to the subframe when the unlicensed carrier is contended by the transmitting end. Or synchronization signal starts and is received periodically or for a predefined number of times from the subframe next to the subframe when the unlicensed carrier is contended by transmitting end.

In an exemplary embodiment, the reference signal includes one or more of a Cell-specific Reference Signal (CRS), a Positioning Reference Signal (PRS), a Channel State Information Reference Signal (CSI-RS), and a Sounding Reference Signal (SRS). And the reception unit is arranged to receive the reference signal is only from a first OFDM symbol after the unlicensed carrier is contended by the transmitting end, and receive the reference signal at least in a complete subframe, or receive the reference signal periodically from the subframe when the unlicensed carrier is contended by the transmitting end, or receive the reference signal for a predefined number of times from the subframe when the unlicensed carrier is contended by the transmitting end.

In an exemplary embodiment, the reception module is further arranged to acquire information of a time length during which the unlicensed carrier is occupied by the transmitting end by receiving synchronization signals and/or reference signals transmitted in the unlicensed carrier.

In an exemplary embodiment, the start symbol identities are used to identify start positions of complete OFDM symbols in the remaining resources. The start symbol identities are a sequence which is agreed by the receiving end with the transmitting end in advance or which is configured by the transmitting end, the receiving end agrees with the transmitting end that the sequence is transmitted in OFDM positions in the remaining resources, and when the transmitting end configures the sequence corresponding to the start symbol identities, configuration information of the start symbol identities is received through a RRC message or DCI signaling in the licensed carrier.

In an exemplary embodiment, the reception module is arranged to, when the start symbol identities are LTE PSS/SSSes, receive the LTE PSS/SSSes in carrier frequency-domain positions different from those of the LTE PSS/SSSes specified in the 3GPP TS 36.211 V10.2.0. Herein when the PSS/SSSes of the start symbol identities are received, an OFDM symbol interval different from that of the LTE PSS/SSSes specified in the 3GPP TS 36.211 V10.2.0 is maintained. Or a time order in which the PSS/SSSes of the start symbol identities are received is different from that of the LTE PSS/SSSes specified in the 3GPP TS 36.211 V10.2.0.

In an exemplary embodiment, the apparatus further includes the following module.

A configuration module is arranged to agree with the transmitting end in advance on the reference signal or receive the reference signal configured and transmitted by the transmitting end, and receive configuration information of the reference signal through a RRC message or DCI signaling of the licensed carrier, herein the reference signal includes a CSI-RS, a CRS, a DMRS, a discovery signal or a RS to be monitored.

In an exemplary embodiment, the apparatus further includes the following module.

A configuration module is arranged to, when the reference signal includes the CSI-RS, agree with the transmitting end on or configure by the transmitting end preemption of the right to use the unlicensed carrier as an event to trigger transmission of the CSI-RS.

In an exemplary embodiment, when the reference signal includes the CSI-RS, the reception module is arranged to:

receive the CSI-RS in accordance with CSI-RS configuration agreed in advance with the transmitting end; or receive the CSI-RS in accordance with the CSI-RS configuration which is received in advance through the licensed carrier; or receive the CSI-RS in LTE OFDM symbols in the subframe when the unlicensed carrier is contended by the transmitting end, or receive the CSI-RS from a subframe next to the subframe when the unlicensed carrier is contended by the transmitting end.

The embodiments of the present disclosure further provide a computer readable storage medium having computer executable instructions stored thereon for performing the method described above.

The embodiments of the present disclosure enable re-utilization of resources of generated incomplete subframes during the contention for the right to use the unlicensed carrier by the LTE system, so as to avoid a waste of resources.

After the accompanying drawings and detailed description are read and understood, other aspects can be understood.

SPECIFIC EMBODIMENTS

Figure 1:
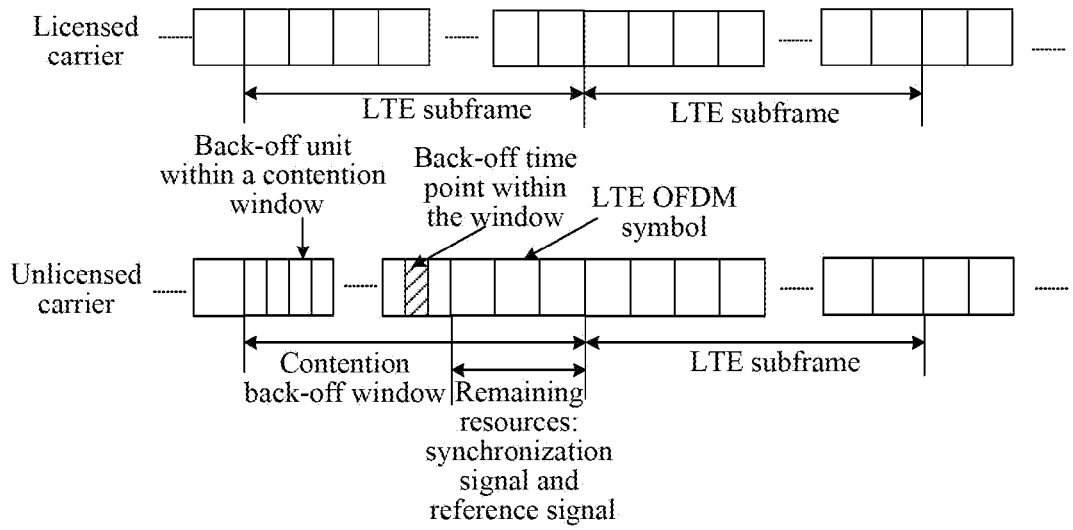
FIG. 1 is a diagram of utilization of unlicensed carrier resources according to embodiment one.

The technical solutions of the present disclosure will be described in more detail below with reference to the accompanying drawings and embodiments.

It is to be illustrated that the embodiments of the present disclosure and various features in the embodiments can be combined with each other without conflict, and they are within the protection scope of the present disclosure.

The embodiments of the present disclosure propose a method for transmitting a signal using an unlicensed carrier, herein, after a base station preempts an unlicensed carrier within a contention back-off window, the base station transmits one or more of the following signals in remaining resources and/or a subframe subsequent to the remaining resources within the contention back-off window using the unlicensed carrier: start symbol identity information, a synchronization signal, a reference signal, and a service data signal (i.e., a PDSCH of the LTE, including system broadcast information). The remaining resources include complete Orthogonal Frequency-Division Multiplexing (OFDM) symbols located in the contention back-off window and after a time point when the right to use the unlicensed carrier is contended, or complete OFDM symbols from the time point when the right to use the unlicensed carrier is contended by the base station up to an end time of a subframe in which the time point is located. Herein, in the unlicensed carrier, if the base station transmits service data in a subframe corresponding to the time when the unlicensed carrier is contended, the base station transmits control information corresponding to the service data in a licensed carrier, herein a time-domain position of the control information is a subframe next to the subframe corresponding to the time point when the unlicensed carrier is contended by the base station. The base station may also transmit the control information in the unlicensed carrier, herein the time-domain position of the control information is the subframe next to the subframe corresponding to the time when the unlicensed carrier is contended by the base station.

In an exemplary embodiment, the base station may transmit one or more of the following information related to the unlicensed carrier through the licensed carrier to a subordinate receiving end (for example, a UE) before contending for the unlicensed carrier: a start point of the contention back-off window, and a back-off time point within the contention back-off window. The information related to the unlicensed carrier may further include frequency point configuration information of the unlicensed carrier, but when unlicensed carriers supported by the receiving end and the base station are the same and are an unique set (including a small number of unlicensed carriers), the frequency point configuration information of the unlicensed carrier may be considered by default to be always configured at the receiving end side and the base station side, and is frequency point configuration information of the unlicensed carriers in the unique set.

In an exemplary embodiment, if the information related to the unlicensed carrier transmitted by the base station does not include the back-off time point in the contention back-off window, or the base station includes, in the control information, the back-off time point in the contention back-off window or includes equivalent information having the same function as that of the back-off time point in the contention back-off window in the control information. The equivalent information includes LTE OFDM symbol position information which describes transmission of data in a subframe corresponding to the time when the unlicensed carrier is contended by the base station, herein the LTE OFDM symbol position information is numbers of LTE OFDM symbols which are arranged from the end time of the subframe to the time when the unlicensed carrier is contended by the base station. Or the LTE OFDM symbol position information is numbers of LTE OFDM symbols which are arranged from the start time of the subframe to the end time of the subframe.

In an exemplary embodiment, the base station transmitting the unlicensed frequency point information means that the base station transmits the frequency point of the unlicensed carrier for which it is to contend to the subordinate UE and configures the unlicensed carrier for the UE. Similarly, the UE also considers that the frequency point of the unlicensed carrier transmitted by the base station is the frequency point of the unlicensed carrier configured by the base station for itself. With this default configuration, the carrier configuration and activation process in the LTE carrier aggregation in the related technology can be avoided. The carrier configuration and activation process in the related technology is time-consuming and is not suitable for configuration of the unlicensed carrier (because single use of the unlicensed carrier which is contended is too short to use the related mechanism for carrier configuration and activation).

In an exemplary embodiment, the start point of the contention back-off window is a start time of the contention back-off window in which the base station contends for the unlicensed carrier once. Herein, the description of the start time of the contention back-off window includes directly describing a start time of the contention back-off window or indirectly describing a start time of the contention back-off window through a known time length. For example, the start point of the contention back-off window is described in a description manner of a frame number and a subframe number by firstly giving a frame number of a frame in which the start point of the contention back-off window is located, and then giving a subframe number in the frame. Herein, an arrangement of the frame number and the subframe number is consistent with an arrangement of a frame number and a subframe number of the licensed carrier corresponding to the unlicensed carrier.

In an exemplary embodiment, if there is no monitoring for a fixed time length before the contention back-off window (if a fixed time length is set, the base station needs to perform monitoring within the time length, and if a monitoring result is that the unlicensed carrier is idle, it continues to enter the contention back-off window, and if the monitoring result is that the unlicensed carrier is not idle, subsequent actions are stopped), then: description of the frame number and subframe number which describe the start point of the contention back-off window includes the start point of the contention back-off window being located at a start point of a subframe, i.e., the start point of the subframe is used as the start point of the contention back-off window, that is, a start point of a subframe described by the frame number and the subframe number is the start point of the contention back-off window; or the start point of the contention back-off window being located at an end point of a subframe, i.e., the end point of the subframe is used as the start point of the contention back-off window, that is, the end point of the subframe described by the frame number and the subframe number is the start point of the contention back-off window.

In an exemplary embodiment, if there is monitoring for a fixed time length immediately before the contention back-off window, the start point of the contention back-off window is the end point of the fixed time length. Description of the frame number and the subframe number which describes the start point of the contention back-off window includes the start point of the fixed time length is located at a start point of a subframe, i.e., the start point of the subframe is used as the start point of the fixed time length. That is, the start point of the subframe described by the frame number and the subframe number is the start point of the fixed time length. Or the start point of the fixed time length is located at an end point of a subframe, i.e., the end point of the subframe is used as the start point of the fixed time length, that is, the end point of the subframe described by the frame number and the subframe number is the start point of the fixed time length. With respect to the above-mentioned description, the description of the start point of the contention back-off window may also be added with a description manner of an LTE OFDM symbol, which includes first describing a frame number of a frame in which the start point of the contention back-off window is located, then giving a subframe number in the frame, and then giving the LTE OFDM symbol in the subframe, herein an arrangement of the frame number and the subframe number is consistent with an arrangement of the frame number and the subframe number of the licensed carrier corresponding to the unlicensed carrier. Herein, the LTE OFDM symbol corresponding to the start point may be predetermined as a fixed value in advance, thereby eliminating signaling transmission, or may also be notified through signaling. In an exemplary embodiment, the LTE OFDM symbol corresponding to the start point is a $K^{th}$ LTE OFDM symbol after the PDCCH, a value of K is 1 to 13, and may be 1 or 2, and when K is 2, the first OFDM symbol is reserved for monitoring. Further, the number of OFDM symbols occupied by the PDCCH may be fixed.

In an exemplary embodiment, the contention back-off time point means a back-off time point within the contention back-off window generated by the base station when the base station participates in contention for the unlicensed carrier, herein, before the time point, the base station performs monitoring for the unlicensed carrier, and when the time point arrives, if a result of the monitoring performed by the base station is that the carrier is idle, the base station considers that it acquires the unlicensed carrier, and when the base station performs monitoring before the time point arrives, if the result of the monitoring performed by the base station is that the unlicensed carrier is busy, the base station stops the monitoring, records a time point corresponding to the time of the stopping, and considers that the contention for the unlicensed carrier at this time fails.

In an exemplary embodiment, after the base station preempts the unlicensed carrier in the contention window, the base station confirms, from the time point when the right to use the unlicensed carrier is acquired, positions of LTE OFDM symbols corresponding to the remaining time in the subframe where the time point is located, and then transmits a signal/data using the LTE OFDM symbols. Confirmation of the positions of the LTE OFDM symbols corresponding to the remaining time includes arranging the OFDM symbols according to a time length of an LTE OFDM symbol from the end time of the subframe to a time point when the unlicensed carrier is contended by the base station, until a complete LTE OFDM symbol cannot be arranged. At this time, the signal is transmitted using complete OFDM symbols after this time point.

In an exemplary embodiment, the positions and/or sequences of the LTE OFDM symbols in which the synchronization signal is transmitted are agreed by the base station with the UE in advance. Herein, time-domain positions in which the synchronization signal is transmitted are as follows. The synchronization signal is only transmitted from first 2 LTE OFDM symbols after the unlicensed carrier is contended by the base station. Or the synchronization signal is transmitted from a subframe next to the subframe when the unlicensed carrier is contended by the base station. Or the synchronization signal is transmitted periodically or for a predefined number of times from the subframe next to the subframe when the unlicensed carrier is contended by the base station.

In an exemplary embodiment, when the synchronization signal is an LTE PSS/SSS signal, the base station agrees with a subordinate receiving end that a sequence of synchronization signals transmitted by the base station in the contended unlicensed carrier is the same as a PSS/SSS sequence of the licensed carrier corresponding to the unlicensed carrier, or indicates the PSS/SSS sequence in configuration information transmitted in the licensed carrier.

In an exemplary embodiment, the synchronization signal is used by the base station to identify the positions of the LTE OFDM symbols where the unlicensed carrier is contended by the base station and the base station transmits data in the unlicensed carrier, for example, identifying a start LTE OFDM symbol where the base station transmits data.

In an exemplary embodiment, the reference signal includes one or more of a CRS, a PRS, a CSI-RS and an SRS. The time-domain positions where the reference signal is transmitted are as follows. The reference signal only started to be transmitted from a first OFDM symbol after the unlicensed carrier is contended by the base station, and the reference signal is transmitted at least in a complete subframe, for example, the reference signal is transmitted in a complete subframe next to the subframe corresponding to the time when the unlicensed carrier is contended by the base station. Or the reference signal starts to be transmitted periodically from the subframe when the unlicensed carrier is contended by the base station. Or the reference signal is transmitted for a predefined number of times from the subframe when the unlicensed carrier is contended by the base station.

In an exemplary embodiment, after the unlicensed carrier is contended by the base station, a synchronization signal and/or a reference signal is transmitted in the unlicensed carrier to imply information of the time length in which the base station occupies the unlicensed carrier at this time. The synchronization signal and the reference signal implying information of the time length in which the base station occupies the unlicensed carrier at this time includes agreeing on that different sequences of synchronization signals and/or reference signals represent different occupied time lengths.

In an exemplary embodiment, the base station transmits the reference signal immediately after acquiring the right to use the unlicensed carrier, herein when the reference signal includes a CSI-RS, the CSI-RS transmitted by the base station at this time is transmitted in accordance with CSI-RS configuration which is agreed with the UE in advance, or CSI-RS configuration which is notified by the base station in advance through a licensed carrier. The base station transmits the CSI-RS in an LTE OFDM symbol in the subframe when the unlicensed carrier is contended by itself or the base station transmits the CSI-RS from a subframe next to the subframe when the unlicensed carrier is contended by itself.

In an exemplary embodiment, before the base station contends for the unlicensed carrier, the base station notifies the UE that the base station transmits one or more of a position, a period, and a sequence of the synchronization signal after the unlicensed carrier is contended by itself. And the base station transmits one or more of a type, a port and a period of the reference signal after the unlicensed carrier is contended by itself. Herein, the synchronization signal is transmitted within a subframe when the base station acquires the right to use the unlicensed carrier. A period of the synchronization signal is a period at which the synchronization signal is transmitted within the time when the unlicensed carrier is occupied at this time. A sequence of the synchronization signals is selected from a given set of synchronization sequences which is used to describe the information of the time length in which the base station occupies the unlicensed carrier.

In an exemplary embodiment, after the unlicensed carrier is contended by the base station, the time when the unlicensed carrier is contended is used as the start point of the subframe, divided into subframes from the start point, and the signal is transmitted in a first LTE OFDM symbol of a first divided subframe.

Correspondingly, the embodiments of the present disclosure further provide an apparatus for transmitting a signal using an unlicensed carrier, which should be set as a base station, and include the following module.

A transmission module is arranged to, after a right to use the unlicensed carrier is preempted by the base station, transmit the signal in remaining resources and/or a subframe subsequent to the remaining resources, herein the signal includes one or more of start symbol identity information, a synchronization signal, a reference signal, and a service data signal.

Herein, the remaining resources includes complete Orthogonal Frequency-Division Multiplexing (OFDM) symbols located in a contention back-off window and after a time point when the right to use the unlicensed carrier is contended, or complete OFDM symbols from the time point when the right to use the unlicensed carrier is contended by the base station up to an end time of a subframe in which the time point is located.

In an exemplary embodiment, the transmission module is arranged to, when the signal includes the service data signal, transmit control information corresponding to the service data in a licensed carrier or the unlicensed carrier, herein a time-domain position of the control information is a subframe next to the subframe corresponding to the time point when the unlicensed carrier is contended by the base station.

In an exemplary embodiment, the transmission module is arranged to use the time point when the unlicensed carrier is contended as a start point of the subframe, divide into subframes from the start point, and start to transmit the signal from a first OFDM symbol in a first divided subframe.

In an exemplary embodiment, the transmission module is arranged to arrange OFDM symbols in accordance with a time length of an OFDM symbol from the end point of the subframe to the time point when the unlicensed carrier is contended by the base station, until a complete OFDM symbol cannot be arranged, and transmit the signal using complete OFDM symbols after the time point when the unlicensed carrier is contended by the base station.

In an exemplary embodiment, the apparatus further comprises:

a configuration module is arranged to agree with a receiving end in advance on time-domain positions where the synchronization signal is transmitted, herein the synchronization signal is only transmitted in first 2 OFDM symbols after the unlicensed carrier is contended. Or the synchronization signal is transmitted from the subframe next to the subframe when the unlicensed carrier is contended by the base station. Or the synchronization signal is transmitted periodically or for a predefined number of times from the subframe next to the subframe when the unlicensed carrier is contended. Or the synchronization signal and/or the reference signal in the unlicensed carrier is transmitted after the unlicensed carrier is contended to imply information of a time length in which the unlicensed carrier is occupied by the base station at this time.

In an exemplary embodiment, the reference signal includes one or more of a Cell-specific Reference Signal (CRS), a Positioning Reference Signal (PRS), a Channel State Information Reference Signal (CSI-RS), and a Sounding Reference Signal (SRS). And the reference signal is only transmitted in remaining resources after the unlicensed carrier is contended by the base station, and includes at least a complete subframe. Or the reference signal is transmitted periodically from the subframe when the unlicensed carrier is contended by the base station. Or the reference signal is transmitted for a predefined number of times from the subframe when the unlicensed carrier is contended by the base station.

In an exemplary embodiment, the start symbol identities are used to identify start positions of complete OFDM symbols in the remaining resources. The start symbol identities are a sequence which is agreed by the base station with the UE in advance or which is configured by the base station, the base station agrees with the UE that the sequence is transmitted in OFDM positions in the remaining resources, and when the base station configures the sequence corresponding to the start symbol identities, the base station transmits configuration information of the start symbol identities to the UE through a RRC message or DCI signaling in the licensed carrier.

In an exemplary embodiment, when the start symbol identities are LTE PSS/SSSes, the base station transmits the start symbol identities in carrier frequency-domain positions different from those of the LTE PSS/SSSes specified in the 3GPP TS 36.211 V10.2.0. Or an OFDM symbol interval different from that of the LTE PSS/SSSes specified in the 3GPP TS 36.211 V10.2.0 is maintained between the PSS/SSSes of the start symbol identities. Or a time order of the PSS/SSSes of the start symbol identities is different from that of the LTE PSS/SSSes specified in the 3GPP TS 36.211 V10.2.0.

In an exemplary embodiment, the apparatus further includes the following module. A configuration module is arranged to agree with the UE in advance on or configure the reference signal to be transmitted, and transmit configuration information of the reference signal to the UE through a RRC message or DCI signaling of the licensed carrier, herein the reference signal includes a CSI-RS, a CRS, a DMRS, a discovery signal or a RS to be monitored.

In an exemplary embodiment, the configuration module is further arranged to, when the reference signal includes the CSI-RS, agree with the UE on or configure preemption of the right to use the unlicensed carrier as an event to trigger transmission of the CSI-RS.

The embodiments of the present disclosure further provide a method for receiving a signal in an unlicensed carrier. A receiving end (for example, a UE) receives the signal in remaining resources and/or a subframe subsequent to the remaining resources in the unlicensed carrier, herein signal includes one or more of: start symbol identity information, a synchronization signal, a reference signal, and a service data signal. Herein, the remaining resources include complete Orthogonal Frequency-Division Multiplexing (OFDM) symbols located in the contention back-off window of a transmitting end and after a time point when the right to use the unlicensed carrier is contended, or complete OFDM symbols from the time point when the right to use the unlicensed carrier is contended by the base station up to an end time of a subframe in which the time point is located.

The receiving end may further receive information of the unlicensed carrier transmitted by the transmitting end (for example, the base station) before receiving the signal. Herein, the information of the unlicensed carrier includes one or more of the following points: a start point of the contention back-off window and a back-off time point within the contention back-off window. The signals may all have corresponding configuration information. Herein, if the UE receives the service data from the unlicensed carrier, the UE receives the control information corresponding to the service data in the licensed carrier, which receives the control information in a subframe next to the subframe corresponding to the time when the unlicensed carrier is contended. And the UE may also receive the control information in the unlicensed carrier (the base station may transmit the control information in the unlicensed carrier), herein the time-domain positions of the control information are within the subframe next to the subframe corresponding to the time when the unlicensed carrier is contended by the base station. The above basic idea is an inverse process of the method at the base station as described above.

Further, if the information related to the unlicensed carrier received by the UE does not include the back-off time point in the contention back-off window, the UE acquires, in the control information, the back-off time point in the contention back-off window or the UE acquires equivalent information of the back-off time point in the contention back-off window in the control information. The equivalent information includes LTE OFDM symbol position information which describes transmission of data in the subframe corresponding to the time when the unlicensed carrier is contended by the base station. The LTE OFDM symbol position information is numbers of LTE OFDM symbols which are arranged from the end time of the subframe to the time when the unlicensed carrier is contended by the base station. Or the LTE OFDM symbol position information is numbers of LTE OFDM symbols which are arranged from the start time of the subframe to the end time of the subframe.

In an exemplary embodiment, if the UE receives the unlicensed frequency point for which it is to contend and which is transmitted by the base station to which it belongs, the UE considers that the unlicensed carrier is configured for itself.

In an exemplary embodiment, the start point of the contention back-off window is a start time of the contention back-off window in which the base station contends for the unlicensed carrier once. Herein, the description of the start time of the contention back-off window includes directly describing a start time of the contention back-off window or indirectly describing a start time of the contention back-off window through a known time length.

In an exemplary embodiment, the start point of the contention back-off window is described in a description manner of a frame number and a subframe number by firstly giving a frame number of a frame in which the start point of the contention back-off window is located, and then giving a subframe number in the frame. Herein, an arrangement of the frame number and the subframe number is consistent with an arrangement of a frame number and a subframe number of the licensed carrier corresponding to the unlicensed carrier.

In an exemplary embodiment, if there is no monitoring for a fixed time length before the contention back-off window, then: the description of the frame number and subframe number which describe the start point of the contention back-off window includes the following points. The start point of the contention back-off window is located at a start point of a subframe, i.e., the start point of the subframe is used as the start point of the contention back-off window, that is, a start point of a subframe described by the frame number and the subframe number is the start point of the contention back-off window. Or the start point of the contention back-off window is located at an end point of a subframe, i.e., the end point of the subframe is used as the start point of the contention back-off window, that is, the end point of the subframe described by the frame number and the subframe number is the start point of the contention back-off window.

In an exemplary embodiment, if there is monitoring for a fixed time length immediately before the contention back-off window, the start point of the contention back-off window becomes the end point of the fixed time length. Description of the frame number and the subframe number which describes the start point of the contention back-off window includes the start point of the fixed time length is located at a start point of a subframe, i.e., the start point of the subframe is used as the start point of the fixed time length, that is, the start point of the subframe described by the frame number and the subframe number is the end point of the fixed time length. Or the start point of the fixed time length is located at an end point of a subframe, i.e., the end point of the subframe is used as the start point of the fixed time length, that is, the end point of the subframe described by the frame number and the subframe number is the end point of the fixed time length.

In an exemplary embodiment, the description of the start point of the contention back-off window may also be added with a description manner of an LTE OFDM symbol, which includes first describing a frame number of a frame in which the start point of the contention back-off window is located, then giving a subframe number in the frame, and then giving the LTE OFDM symbol in the subframe, herein the frame number and the subframe number are arranged in accordance with the frame number and the subframe number of the licensed carrier corresponding to the unlicensed carrier. Herein, the LTE OFDM symbol corresponding to the start point may be set a fixed value in advance, thereby omitting the signal transmission. Or, the LTE OFDM symbol corresponding to the start point is a $K^{th}$ LTE OFDM symbol after the PDCCH, a value of K is 1 to 13, and may be 1 or 2 and when K is 1, the first OFDM symbol includes a fixed time length which is arranged for monitoring, and then a start point of the contention back-off window, or the first OFDM symbol does not include the fixed time length arranged for monitoring, and the start point of the first OFDM symbol is the start point of the contention back-off window. The number of the OFDM symbols occupied by the PDCCH may be fixed. The base station can transmit PHICH information to the UE in the PDCCH.

In an exemplary embodiment, the contention back-off time point means a back-off time point within the contention back-off window generated by the base station when the base station participates in contention for the unlicensed carrier, herein, before the time point, the base station performs monitoring for the unlicensed carrier, and when the time point arrives, if a result of the monitoring performed by the base station is that the carrier is idle, the base station considers that it acquires the unlicensed carrier, and when the base station performs monitoring before the time point arrives, if the result of the monitoring performed by the base station is that the unlicensed carrier is busy, the base station pauses the monitoring, records a time point corresponding to the time of the stopping, and considers that the contention for the unlicensed carrier at this time fails.

In an exemplary embodiment, the UE judging whether the base station to which it belongs acquires the right to use the unlicensed carrier includes that the UE making a judgment according to whether the base station to which it belongs transmits a related signal/data, herein the signal/data are transmitted in the following positions. After the base station to which the UE belongs preempts the unlicensed carrier in the contention window, the base station confirms, from the time point when the right to use the unlicensed carrier is acquired, positions of LTE OFDM symbols corresponding to the remaining time in the subframe where the time point is located, and then transmits a signal/data using the LTE OFDM symbols. Confirmation of the positions of the LTE OFDM symbols corresponding to the remaining time includes arranging the OFDM symbols according to a time length of an LTE OFDM symbol from the end time of the subframe to a time point when the unlicensed carrier is contended by the base station, until a complete LTE OFDM symbol cannot be arranged. At this time, the signal is transmitted using complete OFDM symbols after this time point.

In an exemplary embodiment, the positions and/or sequences of the LTE OFDM symbols in which the synchronization signal is received are agreed by the UE with the base station in advance. Herein, the synchronization signal is only received from first 2 LTE OFDM symbols after the unlicensed carrier is contended by the base station, or the synchronization signal is received from a subframe next to the subframe when the unlicensed carrier is contended by the base station, or the synchronization signal is received periodically from the subframe next to the subframe when the unlicensed carrier is contended by the base station or is received for a predefined number of times within a period of time in which the unlicensed carrier is contended by the base station.

In an exemplary embodiment, when the synchronization signal is a PSS/SSS signal, the UE agrees with the base station to which it belongs that a sequence of synchronization signals received by the UE in the unlicensed carrier contended by the base station is the same as a PSS/SSS sequence of the licensed carrier corresponding to the unlicensed carrier, or the UE acquires the PSS/SSS sequence in configuration information in the licensed carrier.

In an exemplary embodiment, the UE knows that the positions of the LTE OFDM symbols where the unlicensed carrier is contended by the base station to which it belongs and the base station transmits data in the unlicensed carrier through the synchronization signal, and in an exemplary embodiment, the UE considers that the base station to which it belongs transmits the synchronization signal in a start LTE OFDM symbol in the occupied unlicensed carrier.

In an exemplary embodiment, the reference signal includes one or more of a CRS, a PRS, a CSI-RS and an SRS. The time-domain positions where the reference signal is received are as follows. The reference signal is only received from a first OFDM symbol after the unlicensed carrier is contended by the base station, and the reference signal is received at least in a complete subframe. Or the reference signal is received periodically from the subframe when the unlicensed carrier is contended by the base station. Or the reference signal is received for a predefined number of times from the subframe when the unlicensed carrier is contended by the base station.

In an exemplary embodiment, the UE knows information of the time length in which the base station to which it belongs occupies the unlicensed carrier by receiving the synchronization signal and/or the reference signal transmitted in the unlicensed carrier. The UE knowing information of the time length in which the base station to which it belongs occupies the unlicensed carrier by receiving the synchronization signal and/or the reference signal transmitted in the unlicensed carrier includes that the UE knowing information of the time length in which the base station to which it belongs occupies the unlicensed carrier according to an agreement that different sequences of synchronization signals and/or reference signals represent different occupied time lengths.

In an exemplary embodiment, the UE assumes that the base station transmits the reference signal immediately after acquiring the right to use the unlicensed carrier, herein when the reference signal includes a CSI-RS, the CSI-RS transmitted by the base station at this time is transmitted in accordance with CSI-RS configuration which is agreed with the UE in advance, or CSI-RS configuration which is notified by the base station to the UE in advance through a licensed carrier. The UE assumes that the base station transmits the CSI-RS in an LTE OFDM symbol in the subframe when the unlicensed carrier is contended by itself or the UE assumes that the base station transmits the CSI-RS from a subframe next to the subframe when the unlicensed carrier is contended by itself.

In an exemplary embodiment, before the base station contends for the unlicensed carrier, the base station notifies the UE that the base station transmits one or more of a position, a period, and a sequence of the synchronization signal after the unlicensed carrier is contended by itself. And the base station transmits one or more of a type, a port and a period of the reference signal after the unlicensed carrier is contended by itself. Herein, the synchronization signal is transmitted within a subframe when the base station acquires the right to use the unlicensed carrier. A period of the synchronization signal is a period at which the synchronization signal is transmitted within the time when the unlicensed carrier is occupied at this time. A sequence of the synchronization signals is selected from a given set of synchronization sequences which is used to describe the information of the time length in which the base station occupies the unlicensed carrier.

In an exemplary embodiment, the time when the unlicensed carrier is contended by the base station is used as the start point of the subframe, divided into subframes from the start point, and the signal is received in a first LTE OFDM symbol of a first divided subframe.

Correspondingly, the embodiments of the present disclosure further provide an apparatus for receiving a signal using an unlicensed carrier, which should be arranged as a receiving end and includes the following module.

A reception module is arranged to receive the signal in remaining resources in the unlicensed carrier and/or a subframe subsequent to the remaining resources, herein the signal includes one or more of start symbol identity information, a synchronization signal, a reference signal, and a service data signal.

Herein, the remaining resources includes complete Orthogonal Frequency-Division Multiplexing (OFDM) symbols located in a contention back-off window of a transmitting end and after a time point when the right to use the unlicensed carrier is contended, or complete OFDM symbols from the time point when the right to use the unlicensed carrier is contended by the transmitting end up to an end time of a subframe in which the time point is located.

In an exemplary embodiment, the reception module is arranged to, when the signal includes the service data signal, receive control information corresponding to the service data in a licensed carrier or the unlicensed carrier, herein a time-domain position of the control information is a subframe next to the subframe corresponding to the time point when the unlicensed carrier is contended by the transmitting end.

In an exemplary embodiment, the apparatus further includes the following unit. A configuration unit is arranged to agree with the transmitting end in advance on time-domain positions where the synchronization signal is received, herein the synchronization signal is only received in first 2 OFDM symbols after the unlicensed carrier is contended by the transmitting end. Or the synchronization signal is received from the subframe next to the subframe when the unlicensed carrier is contended by the transmitting end. Or the synchronization signal is received periodically or for a predefined number of times from the subframe next to the subframe when the unlicensed carrier is contended by transmitting end.

In an exemplary embodiment, the reference signal includes one or more of a Cell-specific Reference Signal (CRS), a Positioning Reference Signal (PRS), a Channel State Information Reference Signal (CSI-RS), and a Sounding Reference Signal (SRS). And the reception unit is arranged to receive the reference signal is only from a first OFDM symbol after the unlicensed carrier is contended by the transmitting end, and receive the reference signal at least in a complete subframe, or receive the reference signal periodically from the subframe when the unlicensed carrier is contended by the transmitting end, or receive the reference signal for a predefined number of times from the subframe when the unlicensed carrier is contended by the transmitting end.

In an exemplary embodiment, the reception module is further arranged to acquire information of a time length during which the unlicensed carrier is occupied by the transmitting end by receiving synchronization signals and/or reference signals transmitted in the unlicensed carrier.

In an exemplary embodiment, the start symbol identities are used to identify start positions of complete OFDM symbols in the remaining resources. The start symbol identities are a sequence which is agreed by the receiving end with the transmitting end in advance or which is configured by the transmitting end, the UE agrees with the transmitting end that the sequence is transmitted in OFDM positions in the remaining resources, and when the transmitting end configures the sequence corresponding to the start symbol identities, configuration information of the start symbol identities is received through a RRC message or DCI signaling in the licensed carrier.

In an exemplary embodiment, the reception module is arranged to, when the start symbol identities are LTE PSS/SSSes, receive the LTE PSS/SSSes in carrier frequency-domain positions different from those of the LTE PSS/SSSes specified in the 3GPP TS 36.211 V10.2.0. When the PSS/SSSes of the start symbol identities are received, an OFDM symbol interval different from that of the LTE PSS/SSSes specified in the 3GPP TS 36.211 V10.2.0 is maintained. Or a time order in which the PSS/SSSes of the start symbol identities are received is different from that of the LTE PSS/SSSes specified in the 3GPP TS 36.211 V10.2.0.

In an exemplary embodiment, an agreement is made with the transmitting end in advance on the reference signal or the reference signal configured and transmitted by the transmitting end is received, and configuration information of the reference signal is received through a RRC message or DCI signaling of the licensed carrier, herein the reference signal includes a CSI-RS, a CRS, a DMRS, a discovery signal or a RS to be monitored.

In an exemplary embodiment, the apparatus further includes the following module.

A configuration module is arranged to, when the reference signal includes the CSI-RS, agree with the transmitting end on or configure by the transmitting end preemption of the right to use the unlicensed carrier as an event to trigger transmission of the CSI-RS.

Embodiment One

In step 1, a base station selects a relatively idle unlicensed carrier as a candidate unlicensed carrier to be preempted for use through a measurement or carrier selection mechanism.

If the base station has selected the unlicensed carrier to be preempted, then the base station may notify the UE of information such as a frequency point, a bandwidth, etc. (if the bandwidth is fixed, there is no need to notify it) of the unlicensed carrier through a licensed carrier. Since there is a number of unlicensed carriers available for access in the unlicensed frequency band, notification of the frequency point information of the unlicensed carrier to the subordinate UE can prevent the UE from simultaneously receiving or blindly detecting data in a plurality of candidate unlicensed carriers at the same time. This information may be transmitted to the UE when a RRC connection is established. The base station and the UE will consider that the base station passes through the frequency point of the unlicensed carrier of the UE, and the UE will use it as its own configuration carrier. After the base station preempts the unlicensed carrier, it will no longer perform a carrier configuration process during the existing carrier aggregation. When unlicensed carriers supported by the UE and the base station are the same and are an unique set (including a small number of unlicensed carriers), the information may be considered by default to be always configured on the UE side and the base station side, and is unlicensed carriers in the unique set.

In step 2, the base station acquires a start time of contention for the right to use the unlicensed carrier (which may be achieved by the base station performing monitoring for a fixed time length or receiving information of an occupied time length transmitted by the base station which occupies the unlicensed carrier), and before the base station participates in contention for the right to use the unlicensed carrier the next time, the base station transmits the start point information of the contention back-off window to the subordinate UE.

The start point information of the contention back-off window is calculated according to the timing of the licensed carrier (for example, a frame number, a subframe number, and an OFDM symbol of the licensed carrier). For example, when Carrier Aggregation (CA) is performed for the licensed carrier and the unlicensed carrier, subframes of the unlicensed carrier and the licensed carrier are aligned, and therefore the base station may notify the UE through the licensed carrier of the start point of the contention back-off window in which the base station participate in contention for the unlicensed carrier. For example, a start position of a subframe position described by a frame number and a subframe number may be agreed as the start point of the contention back-off window in which the base station contends for the unlicensed carrier at this time.

Notification of the start point of the contention back-off window is for the purpose of helping the UE to explicitly understand that a time-domain range in which the base station transmits data may be received, and the UE cannot perform reception and blind detection before this time point, thereby facilitating the UE to save power.

Before starting the next contention for an unlicensed carrier, the base station notifies information of a back-off time point in the contention back-off window which is generated randomly during the next contention to the UE through the licensed carrier. The back-off time point may be remaining time during the last contention. For example, the random back-off time point of the first contention is 50, and as a result, when a counter counts down to 30, the base station monitors that the channel is busy and thereby stops the contention at this time, and the counter pauses at the same time. Then, when the base station performs contention the next time, the back-off time point of the base station is 30, and there is no need for regeneration. Until the back-off time point is count down to 0, a new time point value is required to be generated randomly the next time.

In step 3, if the base station monitors that the unlicensed carrier is idle all the time until the back-off time point arrives (when a value corresponding to the back-off time point is count down to 0), the base station considers that the unlicensed carrier is preempted. The base station transmits a signal in a first OFDM symbol thereafter, herein the signal includes a synchronization signal and various reference signals. If the base station monitors that the unlicensed carrier is busy before the back-off time point is reached, the base station considers that the unlicensed carrier is not preempted. Then, the base station does not transmit the signal until the next re-preemption.

The first OFDM symbol is determined as follows. As shown in FIG. 1, from a back-off time point in the contention back-off window to a start point of a next subframe, the base station arranges OFDM symbols from the start point of the next subframe to the back-off time in the contention back-off window in accordance with a time length of an ODFM symbol, until a complete OFDM symbol cannot be arranged. At this time, the first LTE OFDM symbol is an OFDM symbol closest to the back-off time point. It is to be noted that there may be no complete LTE OFDM symbol, and at this time, the base station does not transmit the above signals.

In step 4, after receiving the above information, the UE analyzes the information and determines a start time when the base station to which it belongs participates in contention for an unlicensed carrier and a time when the base station may transmit data (within a time length of one LTE OFDM symbol after the back-off time within the contention back-off window) according to the timing of the licensed carrier. In the present embodiment, the timings of the licensed carrier and the unlicensed carrier are the same, and the frame numbers and subframe numbers are aligned. Therefore, the UE knows the frame number and the subframe number of the licensed carrier, and thus knows the frame number and the subframe number of the unlicensed carrier.

The UE determines the start position of the first LTE OFDM required to be blindly detected (the start position may be a small arrange, in order to avoid an error in the timing) in accordance with a manner in which the first LTE OFDM symbol is determined as described above according to the back-off time point within the contention window and the start time of the next subframe. Then, a signal which may be transmitted by the base station to which it belongs starts to be blindly detected (for example, a synchronization signal transmitted by the base station is blindly detected, for example, the base station agrees with the UE before contention that after the unlicensed carrier is contended, the base station transmits the LTE PSS/SSS in the first LTE OFDM symbol). If the blind detection is successful, it is considered that the base station to which the UE belongs has preempted the unlicensed carrier, and may perform necessary processing such as synchronization, measurement, etc. using these signals. If the blind detection fails, the UE may consider that the base station to which it belongs fails to preempt the unlicensed carrier. However, at this time, due to the presence of a certain error probability in the blind detection of the UE, it is specific that the UE still cannot completely exclude the failure of the base station, and the UE still needs to detect whether there is its own control information on the unlicensed carrier in the next subframe.

In an exemplary embodiment, the UE can determine whether to perform detection of a signal which is transmitted after the unlicensed carrier is contended by the base station to which it belongs according to the back-off time point within the contention back-off window transmitted by the base station. For example, if the back-off time point notified by the base station to the UE is greater than a threshold value, for example, when a complete OFDM symbol cannot exist between the back-off time point and the next subframe, the UE may not perform blind detection of the signal transmitted by the base station to which it belongs, thereby achieving the effects of saving power.

Embodiment Two

The solution of the embodiment two is similar to that of the embodiment one, except that the unlicensed carrier information transmitted by the base station to the UE in the embodiment two does not include the back-off time point within the contention window.

Figure 2:
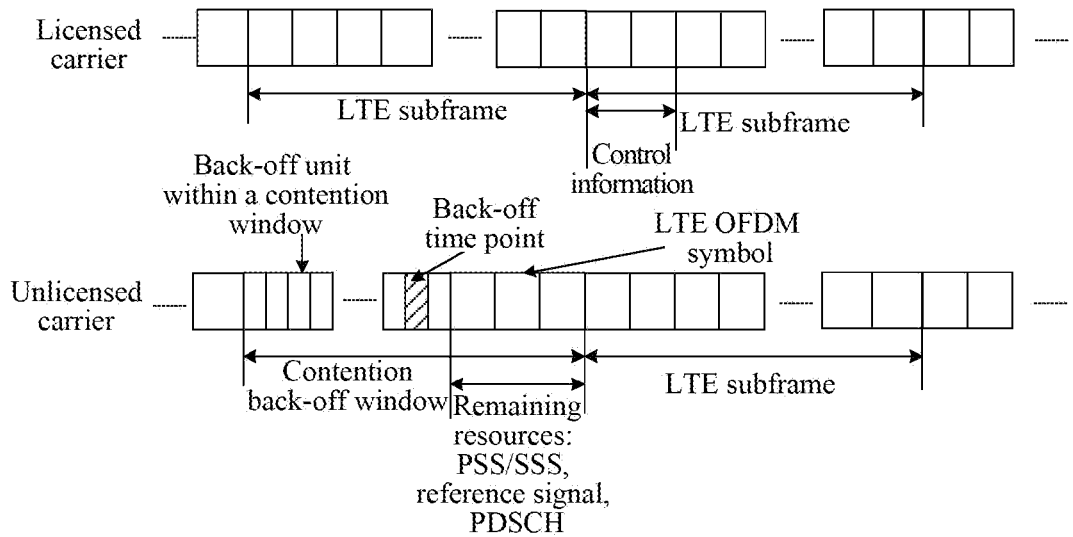
FIG. 2 is a diagram of utilization of unlicensed carrier resources according to embodiment two.

As shown in FIG. 2, after the unlicensed carrier is contended by the base station in the embodiment two, the signal transmitted to the UE further includes a service data signal such as a PDSCH, and the remaining transmitted signals are the same as those in the embodiment one. Further, the base station agrees with the UE that the base station transmits a PSS in a first LTE OFDM symbol and transmits an SSS in a second LTE OFDM symbol after preempting the unlicensed carrier. In an exemplary embodiment, an interchanged mode may be used, for example, the base station agrees with the UE that the base station transmits the SSS in the first LTE OFDM symbol and transmits PSS in the second LTE OFDM symbol after preempting the unlicensed carrier, thereby avoiding the influence on the normal blind detection of the PSS/SSS by the UE when the LTE PSS/SSS is supported to be transmitted in the unlicensed carrier. The base station notifies the UE of a transmitted PSS/SSS sequence or a PSS/SSS sequence which is agreed with the UE in advance. For example, the base station agrees with the UE that the sequence is the same as the PSS/SSS sequence of the corresponding licensed carrier.

In the present embodiment, the base station also transmits the control information corresponding to the PDSCH in the licensed carrier. Alternatively, as shown in FIG. 2, the base station may transmit the control information in the subframe next to the subframe of the licensed carrier aligned with the contention back-off window in the unlicensed carrier, for example, transmits the control information using an (e)PDCCH.

The base station may also transmit, in the licensed carrier, information which describes a start OFDM symbol in which the base station transmits the PDSCH in the subframe where the contention back-off window in the unlicensed carrier is located. The information may be placed in the same subframe as the control information for transmission, or may also be contained in the control information for transmission.

On the UE side, in the present embodiment, the UE determines the start point from which the base station contends for the unlicensed carrier in the unlicensed carrier according to the unlicensed carrier information (carrier frequency point and a start point of the contention back-off window) transmitted by the base station in combination with the subframe timing of the licensed carrier. Then, the UE receives all data in the unlicensed carrier from the time point and stores the data. Then, the UE receives the control information and the information which describes the start OFDM symbol of the PDSCH in the subframe next to the subframe of the licensed carrier aligned with the contention back-off window of the unlicensed carrier. The UE determines whether the control information contains its own control information by means of blind detection. If so, the received data is intercepted and decoded according to the control information. Or the UE may also start to blindly detect the PSS and SSS (base station) in the unlicensed carrier in accordance with an LTE OFDM symbol from the start point of the contention back-off window. At this time, if the UE can detect the PSS/SSS agreed with the base station or the PSS/SSS notified by the base station, the UE can confirm that the unlicensed carrier is contended by the base station to which it belongs, confirms the start LTE OFDM in which the base station to which it belongs transmits a signal, and determines the reference signal transmitted by the base station from the stored data, herein the reference signal may be used for synchronization and measurement, etc.

Embodiment Three

Figure 3:
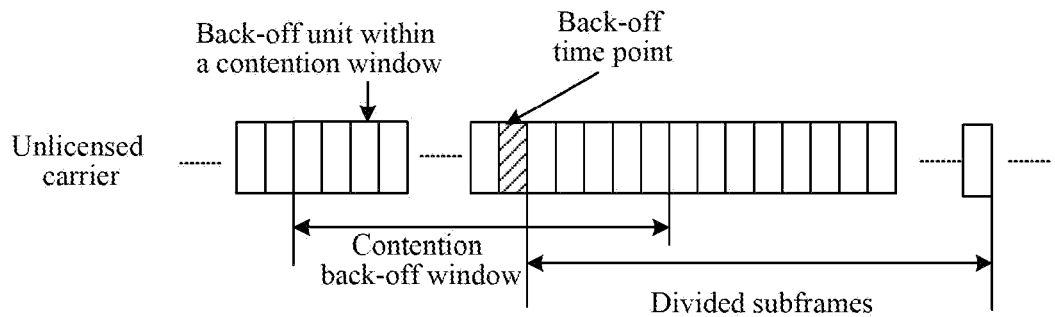
FIG. 3 is a diagram of utilization of unlicensed carrier resources according to embodiment three.

In the embodiments one and two, the subframes of the unlicensed carrier and the licensed carrier are aligned, and the base station arrange the OFDM symbols which are used to transmit a signal from the start time of the next subframe to the back-off time within the contention back-off window in accordance with a time length of an OFDM symbol. Instead, in the embodiment three, after the unlicensed carrier is contended by the base station, that is, when the base station reaches the back-off time point within its own contention window, the base station monitors that the carrier is always idle, the base station directly uses the time point as the start time of the subframe, dividing into subframes backwards in accordance with a time length of an LTE subframe (as shown in FIG. 3), and transmits the signal in the divided subframes.

On the UE side, there is still a need to blindly detect the signal transmitted by the base station to judge whether the base station to which it belongs has acquired the right to use the unlicensed carrier. Or the UE may also make a judgment through the control information in the licensed carrier, herein the transmission manner for the control information is the same as that in the embodiment two, and the detection manner is also the same as that in the embodiment two.

In the present embodiment, the subframes of the unlicensed carrier and the corresponding licensed carrier are not aligned, and the base station needs to agree with the UE in advance that a one-to-one correspondence relationship is established between the subframes of the unlicensed carrier and the corresponding licensed carrier, and then when the base station performs cross-carrier scheduling or the UE performs cross-carrier feedback, both the base station and the UE perform transmission and reception in the licensed carrier according to the one-to-one correspondence relationship.

Embodiment Four

The present embodiment can transmit and receive signals using an unlicensed carrier in the same manner as that in the embodiments one, two and three. In the present embodiment, after the unlicensed carrier is contended by the base station, the reference signal is transmitted using the remaining resources in the contention back-off window. For the period, port, and type of the reference signal, the base station needs to notify them to the UE in advance or agree them with the UE in advance and make them unchanged. For example, when the reference signal is a CSI-RS, the base station may agree with the UE on the period and the port of the CSI-RS in advance so that the configuration information regarding for example the period and port of the UE of the CSI-RS can no longer be notified through the existing RRC message, thereby saving the time.

After the UE side detects that the base station to which it belongs has preempted the unlicensed carrier, the UE side parses the corresponding reference signal from the received data and sets it as the channel measurement. In this way, the configuration delay problem of the existing reference signal can be avoided, thereby improving the utilization and efficiency within the period of time in which the base station preempts the unlicensed carrier.

Embodiment Five

The base station transmits the following information to the UE through the licensed carrier: configuration information of an unlicensed carrier, a start point of a contention back-off window, and a back-off time point within the contention back-off window.

Herein, the configuration information of the unlicensed carrier is defined as follows. Both the base station and the UE consider that once the unlicensed carrier in the configuration information is successfully preempted by the base station, the carrier is a secondary component carrier which is configured by the base station for the UE and is in an active state. If the base station to which the UE belongs does not occupy the unlicensed carrier, the configuration is invalid. The configuration information may include the following parameters: a frequency point, a bandwidth, or a number of the unlicensed carrier (the number is a uniform number for the control of unlicensed carrier division by the country, which may represent the frequency point and the bandwidth). The configuration information of the unlicensed carrier is transmitted in the licensed carrier through a RRC message or through DCI signaling.

Herein, the start point of the contention back-off window includes the following two types. The first type is that the start point is a start position of a subframe or an end position of the subframe. And the second type is that the start point is the beginning of an LTE OFDM in the subframe, and specifically the beginning of a first OFDM symbol after the PDCCH, herein the number of OFDM symbols may be fixed or variable. The start point may be described in a manner as follows. Three parameters are introduced, which are a radio frame, a subframe and a position of an LTE OFDM symbol, to describe the position of the start point, herein the frame number, the subframe number, and the position of the LTE OFDM symbol refer to a corresponding licensed carrier. Herein, the LTE OFDM symbol parameter is used as a selectable parameter. The information of the start point of the contention back-off window may be transmitted in the licensed carrier through DCI signaling or through a RRC message.

Herein, the back-off time point within the contention back-off window is defined as follows. The base station randomly generates a random value within a time length range of the contention window, herein the value corresponds to the back-off time point within the contention window, and the base station counts down from the value, herein one count-down represents that the time length goes through a back-off unit within the contention window. Or, when the value is previously not count down to 0 from the random value, during the next contention, counting is performed using the value which is paused the last time. The back-off time point may be described using a value corresponding to a bit. The information of the back-off time point within the contention back-off window may be transmitted in the licensed carrier through a RRC message or through DCI signaling.

After the base station preempts the unlicensed carrier in the contention back-off window, the remaining complete LTE OFDM symbols are determined and the following signals are transmitted in the symbols or an occupied time length according to the agreement with the UE or configuration information of the unlicensed carrier: start symbol identity information, a synchronization signal, a reference signal, and a PDSCH (including a system broadcast message). The configuration information of the signals described above may be transmitted in the licensed carrier using a RRC message or DCI signaling.

Herein, with respect to the start symbol identity information, the start symbol identity is substantially a sequence. The sequence may be agreed by the base station with the UE or a sequence configured by the base station, and the base station agrees with the UE that the sequence is transmitted in the position of the LTE OFDM in the remaining resources. Optionally, the sequence is a preamble code or an LTE PSS(/SSS). When the LTE PSS/SSS is used, a preferred design is transmitted in frequency-domain positions in the carrier which are different from those for the LTE PSS/SSSes as specified in the 3GPP TS 36.211 V10.2.0. Or an interval between PSS/SSSes is maintained to be different from that for the LTE PSS/SSSes as specified in the 3GPP TS 36.211 V10.2.0, or a time order of the PSS/SSSes is different from that for the LTE PSS/SSSes as specified in the 3GPP TS 36.211 V10.2.0. In an exemplary embodiment, the identity information may also be set for the purpose of synchronization. During transmission, it is transmitted in the licensed carrier using a RRC messages or DCI signaling.

Herein, with respect to the synchronization signal, within the time length in which the base station occupies the unlicensed carrier, the base station agrees with the UE on or the base station configures the period and the start subframe position in which the synchronization signal is transmitted. Herein, it includes a notification of whether the synchronization signal exists. In an exemplary embodiment, the synchronization signal is an LTE PSS/SSS. The start subframe position is described by means of a frame and a subframe. For example, the base station may agree with the UE that the synchronization signal is transmitted from the occupied first complete OFDM symbol. The configuration information of the synchronization signal is transmitted in the licensed carrier using a RRC message or DCI signaling.

Herein, with respect to the reference signal, the base station agrees with the UE on or the base station configures the reference signal to be transmitted and transmits the configuration information to the UE. The reference signal includes a CSI-RS, a CRS, a DMRS, a discovery signal, and a RS to be monitored. For the CSI-RS, base station agrees with the UE on or the base station configures the following content. If the base station preempts the unlicensed carrier, the base station starts transmitting the CSI-RS, and the UE judges that the base station to which it belongs preempts the unlicensed carrier, and considers that there is an agreed CSI-RS to be transmitted in the unlicensed carrier. That is, the base station preempts the unlicensed carrier as an event that triggers transmission of the CSI-RS, thereby eliminating the need for the CSI-RS high-level configuration signaling. The configuration information of the reference signal is transmitted in the licensed carrier using a RRC message or DCI signaling.

Herein, the PDSCH is data of the UE or a system broadcast message. When the PDSCH is transmitted, its corresponding control information is transmitted in the licensed carrier, and the time-domain position is in the subframe next to the subframe corresponding to the contention back-off window.

On the UE side, the UE receives the above-mentioned information and determines, according to parameters in the information, an unlicensed carrier in which a signal transmitted by the base station to which it belongs may be received, and a time point when the signal is received (i.e., the back-off time point within the contention back-off window). According to the configuration information of the signal, it is determined that the signal transmitted by the base station to which the UE belongs may be received, and its own PDSCH is received according to the control signaling.

Herein, the UE determines a time point when it needs to receive the unlicensed carrier according to the frame timing of the licensed carrier and starts receiving the data. The UE blindly detects the start symbol identity information (sequence) after the time point, so as to determine the position of the start LTE OFDM symbol of the remaining resources. Further, the UE receives the reference signal transmitted by the base station according to the configuration information and performs measurement. The UE receives the corresponding control information in the remaining resources from the next subframe of the licensed carrier and analyzes its own data or broadcast information according to the control information.

Other processing flows on the UE side are an inverse process of the processing flows on the base station side, which will not be described here.

Embodiment Six

The present embodiment differs from embodiment five in that:

the base station transmits the following information to the UE through the licensed carrier: configuration information of the unlicensed carrier and a start point of the contention back-off window.

After the base station preempts the unlicensed carrier in the contention back-off window, the remaining complete LTE OFDM symbols are determined and the following signals are transmitted in the OFDM symbol or the occupied time length according to the agreement with the UE or the configuration information: a synchronization signal, a reference Signal, and a PDSCH (including a system broadcast message).

The base station transmits the control information of the unlicensed carrier in the licensed carrier and transmits it in the subframe next to the subframe corresponding to the contention window. Herein, the control information includes resource allocation information of the PDSCH and the start symbol position of the LTE OFDM in the remaining resources.

(Herein, the configuration information of the synchronization signal, the configuration information of the reference signal, and the control information corresponding to the PDSCH may be transmitted through the DCI or may be transmitted independently from the control information of the unlicensed carrier.

On the UE side, the UE receives the above described information, the signal and the control information of the unlicensed carrier. The time point when the signal is received is determined and the data is parsed according to the related information in the signaling and control information. At the same time, according to the configuration information of the signal, the base station receives the synchronization signal and the reference signal in the subsequent occupied time length.

Embodiment Seven

The base station transmits signaling 1 to the UE through the licensed carrier.

After the base station preempts the unlicensed carrier in the contention back-off window, the base station determines the remaining complete LTE OFDM symbols and transmits the following signals in the symbol or the occupied time length according to the agreement with the UE or configuration information: the synchronization signal, the reference signal and the PDSCH (including a system broadcast message).

Herein the signaling 1 is transmitted through the DCI in the licensed carrier, and the signaling 1 includes the following information. The configuration information of the unlicensed carrier, positions of the LTE OFDM symbols in the remaining resources, the configuration information of the synchronization signal, the configuration information of the reference signal, and the control information corresponding to the PDSCH.

Herein, the configuration of the unlicensed carrier, positions of the symbols in the remaining resources, the configuration of the synchronization signal, and the configuration and triggering of the reference signal may be the same as those in the embodiment five.

On the UE side, the UE receives the data in each unlicensed carrier and stores the data, monitors and detects each subframe of the licensed carrier, searches the DCI for the abovementioned signaling 1, and decodes and acquires the related information in the DCI. The stored data is further parsed according to the related information. Other processing flows on the UE side are an inverse process of the processing flows on the base station side, and will not be described here.

Embodiment Eight

When the base station judges that the contention back-off time point is located within a time length of the last LTE OFDM, the base station may transmit the DCI signaling to notify the UE that the base station will not transmit the signal in the remaining resources, and thereby the UE does not perform blind detection or reception and storage;

alternatively, the base station transmits the contention back-off time point to the UE, and the UE performs a judgment. When the back-off time point is within the period of time of the last LTE OFDM symbol, the UE considers that the base station does not transmit a signal in the remaining resources, and thereby the UE does not perform blind detection or reception and storage.

Embodiment Nine

The base station determines the number of unlicensed carriers which can be preempted. The number and frequency points of unlicensed carriers are generally determined and configured for the base station by the operator during deployment, for example, they are configured for the base station in an OAM manner. Then, the unlicensed carriers which can be preempted by the base station can only be these configured unlicensed carriers.

The base station transmits the configuration information of the unlicensed carrier which may be contended by itself to a subordinate UE through a RRC message via a licensed carrier. It should be noted that at this time, if the number of unlicensed carriers which are selectable by the base station is relatively small (for example, one or two, and the frequency points are close to each other), the base station can configure all of them to the subordinate UE. If the number of unlicensed carriers which are selectable by the base stations is large, the base station may configure different unlicensed carriers for different UEs respectively, so as to primarily reduce the number of monitoring or receiving processes for the unlicensed carriers by the UE. The configuration information of the unlicensed carrier may be updated semi-statically or may not be updated after the configuration (for example, the base station has only one unlicensed carrier). Another way is that the base station notifies the UE of the unlicensed carrier which is planned to be preempted before each contention, and at this time, in order to ensure timeliness, the base station can transmit the configuration information of the unlicensed carrier to the UE using DCI information. Or the base station configures the unlicensed carrier for the UE in a manner of combining the RRC message with the DCI. The base station firstly configures the unlicensed carrier for the UE through the RRC message, and then when the base station further configures the unlicensed carrier for the UE through the DCI before the contention, the UE considers that when the base station performs this contention, the unlicensed carrier which is contended should be determined according to the DCI signaling, and if before the contention, the UE does not receive the DCI signaling transmitted by the base station, the UE considers that the unlicensed carrier which is contended by the base station is further determined according to the previous RRC message. This manner is suitable for a scenario where there are a lot of unlicensed carriers which are selectable to be contended by the base station, which can provide flexibility for the contention of the system and increase the probability of scheduling of the UE in the unlicensed carriers.

The DCI signaling is configuration of an unlicensed carrier and may be described using an agreed bit in the existing DCI format. The remaining bits are reserved, or a new DCI format may also be designed to transmit the abovementioned signaling.

The base station transmits information of the start time of the contention back-off window to the UE through the licensed carrier, and the information of the start time of the contention back-off window may be transmitted in a DCI format. In the present embodiment, the base station may transmit the aforementioned configuration information of the unlicensed carrier and the information of the start time of the contention back-off window to the UE through the same DCI, to reduce the times of signaling transmissions.

The base station performs back-off contention for the unlicensed carrier at the determined start time of contention back-off window, if the base station contends successfully, the base station determines remaining resources in the subframe where the contention window is located, and the base station arranges LTE OFDM symbols from the end time of the subframe to the start time, until a complete LTE OFDM symbol cannot be placed between the time points when unlicensed carriers are contended by the base station, and at this time, the complete LTE OFDM symbols in the subframe are remaining resources, the base station transmits the PDSCH of the UE in the remaining resources, and the control signaling of the PDSCH is transmitted in the PDCCH of the next subframe of the licensed carrier according to the DCI format. And the base station transmits the CSI-RS in the remaining resources within the subsequent occupied time length, and the base station transmits the configuration information of the CSI-RS in the DCI format in the PDCCH of the next subframe of the licensed carrier (the CSI-RS is set for CSI measurement of the UE). And the base station transmits the start symbol identity information (in this case, as long as it has a synchronization function) in the LTE OFDM symbol agreed in the remaining resources, for example, the PSS/SSS of LTE is configured. At this time, the time sequence is contrary to that for the LTE, and the base station transmits the sequence of the start symbol identity information and the symbol position information in the foregoing PDCCH in the DCI format. Assuming that the base station occupies a current time length of 5 ms, the base station is arranged to transmit the LTE PSS/SSS only in the first subframe of the complete subframes within the occupied time length (at this time, mainly because the current occupied time is short), and uses the same PCI as that for the licensed carrier (the base station may also temporarily select a suitable PCI for configuration according to PCIs of adjacent cells). The transmitted configuration information of the synchronization signal (including the transmitted position, period and sequence of the subframe) is transmitted in the foregoing PDCCH in the DCI format, or may also be agreed by the base station with the UE in advance. For example, when the occupied time length is less than or equal to 5 and the start symbol identity information is transmitted in the remaining resources, the LTE PSS/SSS is only transmitted in the first complete subframe.

The base station transmits the foregoing various information in the DCI format in the PDCCH of the subframe next to the subframe corresponding to the contention back-off window in the licensed carrier.

On the UE side, the UE receives the configuration information of the unlicensed carrier and the information of the start time of the contention back-off window transmitted by the base station, and the UE receives data and stores the data from the start time of the contention back-off window of the corresponding unlicensed carrier (in the present embodiment, it is assumed as the start time of the subframe). Then, the remaining resources and the configuration information of other parameters within the time length occupied by base station are received in the subframe next to the subframe corresponding to the contention back-off window in the licensed carrier. The UE performs blind detection in a PDCCH domain according to an agreed DCI format (the blind detection is an existing technology) to acquire the desired signaling of the DCI format. The related signaling is parsed, processes such as the synchronization, data interception, reference signal acquisition, etc. are performed respectively according to the parameters in the signaling. Other processing flows on the UE side are an inverse process of the processing flows on the base station side, and will not be described here.

Embodiment Ten

Figure 4:
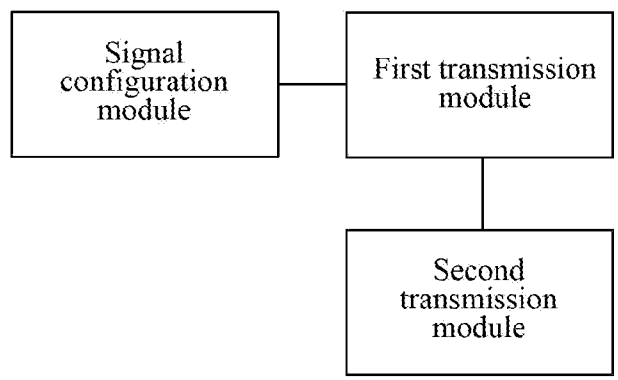
FIG. 4 is a structural diagram of a base station according to embodiment ten.

The present embodiment provides a base station and a receiving end. As shown in FIG. 4, the base station according to the present embodiment includes a first transmission module, arranged to, after a right to use the unlicensed carrier is contended by the base station in a contention back-off window, transmit the signal using remaining resources in the contention back-off window and/or a subframe subsequent to the remaining resources, herein, the remaining resources includes complete Orthogonal Frequency-Division Multiplexing (OFDM) symbols located in a contention back-off window and after a time point when the right to use the unlicensed carrier is contended, or complete OFDM symbols from the time point when the right to use the unlicensed carrier is contended by the base station up to an end time of a subframe in which the time point is located.

The above base station may further include a second transmission module that is arranged to transmit information of the unlicensed carrier through a licensed carrier.

In an exemplary embodiment, the information of the unlicensed carrier includes one or more of the following information: configuration information of the unlicensed carrier, information of a start point of the contention back-off window, and information of a back-off time point within the contention back-off window.

The signal includes one or more of start symbol identity information, a synchronization signal, a reference signal, and a service data signal.

In an exemplary embodiment, when the signal includes the service data signal, the second transmission module is further arranged to transmit control information corresponding to the service data to the UE through the licensed carrier or transmit the control information to the UE in a subframe next to a subframe where the remaining resources are located in the unlicensed carrier.

In an exemplary embodiment, when the information of the unlicensed carrier does not include the back-off time point in the contention back-off window, the control information includes the back-off time point in the contention back-off window or information which describes positions of OFDM symbols in which the base station transmits the signal in the subframe of the unlicensed carrier.

In an exemplary embodiment, the information of the positions of the OFDM symbols is numbers of the OFDM symbols which are arranged from the end time of the subframe corresponding to the time when the unlicensed carrier is contended to the time when the unlicensed carrier is contended by the base station.

In an exemplary embodiment, the information of the positions of the OFDM symbols is numbers of the OFDM symbols which are arranged from the start time of the subframe corresponding to the time when the unlicensed carrier is contended to the end time of the subframe. In an exemplary embodiment, the start symbol identities are used to identify start positions of complete LTE OFDM symbols in the remaining resources. And the start symbol identities are a sequence which is agreed by the base station with the receiving end in advance or which is configured by the base station.

The base station further includes a signal configuration module that is arranged to agree with the receiving end in advance on or configure the sequence, agree with the receiving end on the positions of the LTE ODFM symbols in the remaining resources where the sequence is transmitted. And when the base station configures the sequence corresponding to the start symbol identities, the configuration information of the start symbol identities is transmitted to the receiving end in the licensed carrier through a RRC message or DCI signaling.

In an exemplary embodiment, the base station further includes a signal configuration module that is arranged to agree with the UE in advance on or configure a reference signal to be transmitted, and transmit configuration information of the reference signal to the receiving end through a RRC message or DCI signaling of the licensed carrier, herein the reference signal includes a CSI-RS, a CRS, a DMRS, a discovery signal or a RS to be monitored.

In an exemplary embodiment, the base station further includes a signal configuration module arranged to agree with the receiving end in advance on or configure a period and a start subframe position in which the synchronization signal is transmitted.

Figure 5:
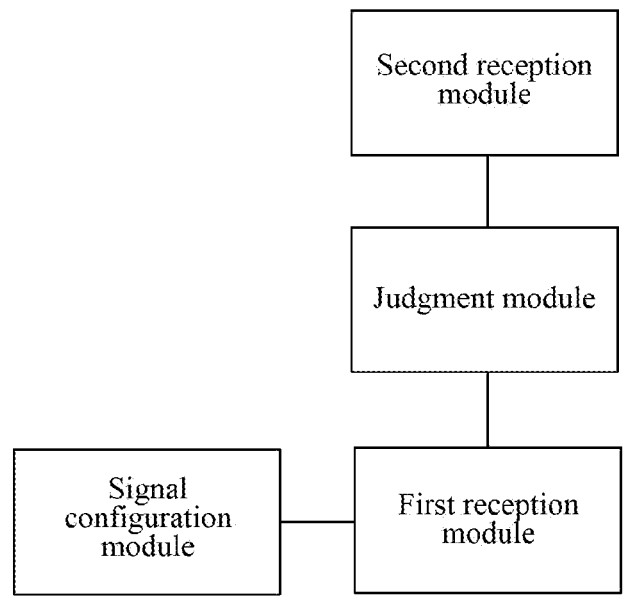
FIG. 5 is a structural diagram of a receiving end according to the embodiment ten.

As shown in FIG. 5, the receiving end according to the present embodiment includes a first reception module, herein the first reception module is arranged to receive the signal which is transmitted by a transmitting end using remaining resources in the contention back-off window and/or a subframe subsequent to the remaining resources, herein, the remaining resources includes complete Orthogonal Frequency-Division Multiplexing (OFDM) symbols located in a contention back-off window and after a time point for the right to use the unlicensed carrier, or complete OFDM symbols from the time point when the right to use the unlicensed carrier is contended by the base station up to an end time of a subframe in which the time point is located.

The receiving end may further include the following modules.

A second reception module is arranged to receive the information of the unlicensed carrier transmitted by the transmitting end through a licensed carrier.

A judgment module is arranged to judge whether the base station acquires the right to use of the unlicensed carrier according to the information of the unlicensed carrier.

The first reception module is arranged to, if the judgment module judges that the transmitting end acquires the right to use of the unlicensed carrier, receive the signal which is transmitted by the transmitting end using remaining resources in the contention back-off window and/or a subframe subsequent to the remaining resources using the information of the unlicensed carrier.

In an exemplary embodiment, the information of the unlicensed carrier includes one or more of the following information: configuration information of the unlicensed carrier, information of a start point of the contention back-off window, and information of a back-off time point within the contention back-off window.

The signal includes one or more of start symbol identity information, a synchronization signal, a reference signal, and a service data signal.

In an exemplary embodiment, when the signal includes the service data signal, the first reception module is further arranged to receive control information corresponding to the service data in the licensed carrier or receive the control information in a subframe next to a subframe where the remaining resources are located in the unlicensed carrier.

In an exemplary embodiment, when the information of the unlicensed carrier does not include the back-off time point in the contention back-off window, the control information includes the back-off time point in the contention back-off window or information which describes positions of OFDM symbols in which the base station transmits the signal in the subframe of the unlicensed carrier.

In an exemplary embodiment, the information of the positions of the OFDM symbols is numbers of the OFDM symbols which are arranged from the end time of the subframe corresponding to the time when the unlicensed carrier is contended to the time when the unlicensed carrier is contended by the base station.

In an exemplary embodiment, the information of the positions of the OFDM symbols is numbers of the OFDM symbols which are arranged from the start time of the subframe corresponding to the time when the unlicensed carrier is contended to the end time of the subframe. In an exemplary embodiment, the start symbol identities are used to identify start positions of complete LTE OFDM symbols in the remaining resources. And the start symbol identities are a sequence which is agreed by the base station with the UE in advance or which is configured by the base station.

The UE further includes a signal configuration module that is arranged to agree with the transmitting end in advance on the sequence, and transmit the positions of the LTE ODFM symbols in the remaining resources where the sequence is transmitted, or receive the configuration information of the start symbol identities transmitted by the base station in the licensed carrier through a RRC message or DCI signaling.

In an exemplary embodiment, the receiving end further includes a signal configuration module that is arranged to agree with the transmitting end in advance on a reference signal to be transmitted, or receive configuration information of the reference signal transmitted by the base station through a RRC message or DCI signaling of the licensed carrier, herein the reference signal includes a CSI-RS, a CRS, a DMRS, a discovery signal or a RS to be monitored.

In an exemplary embodiment, the receiving end further includes a signal configuration module arranged to agree with the transmitting end in advance on a period and a start subframe position in which the synchronization signal is transmitted or receive the period and the start subframe position configured by the base station.

In an exemplary embodiment, the first reception module is arranged to receive the information of the unlicensed carrier transmitted by the transmitting end in the licensed carrier through the RRC message or receive the DCI transmitted by the base station in the PDCCH or ePDCCH of the licensed carrier, herein bits in the DCI describe the information of the unlicensed carrier.

The receiving end according to the embodiments of the present disclosure may be a UE or a base station of a small cell under a macro base station. The transmitting end according to the present embodiment may be a normal base station or a base station of a small cell under a macro base station.

The embodiments of the present disclosure may also be applied to a scenario in which the UE contends directly for an unlicensed carrier (at this time, the UE is equivalent to a base station). At this time, the configuration information of the corresponding information or signal may also be transmitted to the base station or other UEs through Uplink Control Information (UCI). Multiple embodiments of the present disclosure can be used in combination without conflict.

Those skilled in the related art should understand that all or a part of steps in the aforementioned method can be completed by programs instructing the related hardware, and the programs can be stored in a computer readable storage medium, such as a read-only memory, a disk, or a disc, etc. In an exemplary embodiment, all or a part of steps of the aforementioned embodiments can also be implemented with one or more integrated circuits. Correspondingly, each module/unit in the abovementioned embodiments can be implemented in the form of hardware, or can be implemented in the form of software functional modules. The present disclosure is not limited to any specific form of combination of hardware and software.

INDUSTRIAL APPLICABILITY

The embodiments of the present disclosure enable re-utilization of resources of generated incomplete subframes during the contention for the right to use the unlicensed carrier by the LTE system, so as to avoid a waste of resources.

What is claimed is:

1. A method for transmitting a signal using an unlicensed carrier, applied in a base station, comprising:
after a right to use the unlicensed carrier is acquired at a time point within a current subframe, starting to transmit the signal at beginning of remaining resources, transmitting the signal in the remaining resources or the remaining resources and a subframe subsequent to the remaining resources,
wherein the signal comprises a Physical Downlink Shared Channel (PDSCH);
wherein the remaining resources comprises: all complete OFDM symbols from the time point when the right to use the unlicensed carrier is acquired by the base station to an end time of the current subframe.

2. The method according to claim 1, wherein
control information corresponding to the PDSCH is transmitted in a licensed carrier or the unlicensed carrier,
wherein a time-domain position of the control information is a subframe next to a subframe corresponding to a time point when the unlicensed carrier is acquired by the base station.

3. The method according to claim 1, wherein
transmitting the signal in remaining resources and/or a subframe subsequent to the remaining resources comprises:
using the time point when the unlicensed carrier is acquired as a start point of the subframe, starting from the start point, dividing into subframes in accordance with a time length of an LTE subframe, and transmitting the signal from a first OFDM symbol in a first divided subframe;
or
arranging OFDM symbols in accordance with a time length of an OFDM symbol from an end point of the subframe to the time point when the unlicensed carrier is acquired by the base station, until one complete OFDM symbol cannot be arranged, and transmitting the signal using complete OFDM symbols after the time point when the unlicensed carrier is acquired by the base station.

4. A method for receiving a signal using an unlicensed carrier, applied in a receiving end, comprising:
starting to receive the signal at beginning of remaining resources, receiving the signal in the remaining resources or the remaining resources and a subframe subsequent to the remaining resources in the unlicensed carrier,
wherein the signal comprises a Physical Downlink Shared Channel (PDSCH),
wherein the remaining resources comprises: all complete OFDM symbols from a time point within a current subframe when a right to use the unlicensed carrier is acquired by a transmitting end to an end time of the current subframe.

5. The method according to claim 4, wherein
control information corresponding to the PDSCH is received in a licensed carrier or the unlicensed carrier, wherein a time-domain position of the control information is a subframe next to the subframe corresponding to the time point when the unlicensed carrier is acquired by the transmitting end.

6. An apparatus for transmitting a signal using an unlicensed carrier, applied in a base station, comprising:
a transmission module, arranged to, after a right to use the unlicensed carrier is acquired by the base station at a time point within a current subframe, start to transmit the signal at beginning of remaining resources, and transmit the signal in the remaining resources or the remaining resources and a subframe subsequent to the remaining resources,
wherein the signal comprises a Physical Downlink Shared Channel (PDSCH),
wherein, the remaining resources comprises: all complete OFDM symbols from the time point when a right to use the unlicensed carrier is acquired by the base station to an end time of the current subframe.

7. The apparatus according to claim 6, wherein
the transmission module is arranged to transmit control information corresponding to the PDSCH in a licensed carrier or the unlicensed carrier, wherein a time-domain position of the control information is a subframe next to a subframe corresponding to the time point when the unlicensed carrier is acquired by the base station;
or
the transmission module is arranged to use the time point when the unlicensed carrier is acquired as a start point of the subframe, starting from the start point, divide into subframes in accordance with a time length of an LTE subframe, and transmit the signal from a first OFDM symbol in a first divided subframe;
or
the transmission module is arranged to arrange OFDM symbols in accordance with a time length of an OFDM symbol from an end point of the subframe to the time point when the unlicensed carrier is acquired by the base station, until one complete OFDM symbol cannot be arranged, and transmit the signal using complete OFDM symbols after the time point when the unlicensed carrier is acquired by the base station.

* * * * *